United States Patent
Sato et al.

(10) Patent No.: US 8,168,018 B2
(45) Date of Patent: May 1, 2012

(54) METHOD FOR MANUFACTURING HONEYCOMB STRUCTURE

(75) Inventors: Hiroki Sato, Ibi-gun (JP); Seiji Tamura, Ibi-gun (JP); Kazuaki Sakakibara, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 234 days.

(21) Appl. No.: 12/731,151

(22) Filed: Mar. 25, 2010

(65) Prior Publication Data

US 2011/0061797 A1 Mar. 17, 2011

(30) Foreign Application Priority Data

Sep. 14, 2009 (JP) .................. PCT/JP2009/066025

(51) Int. Cl.
- C03B 29/00 (2006.01)
- C04B 33/34 (2006.01)
- B29C 47/00 (2006.01)
- B29C 63/00 (2006.01)

(52) U.S. Cl. ............. 156/89.22; 156/89.11; 156/244.13; 156/701; 156/711; 156/713

(58) Field of Classification Search ............... 156/89.11, 156/89.22, 244.13, 701, 711, 713
See application file for complete search history.

(56) References Cited

U.S. PATENT DOCUMENTS

| | | | | |
|---|---|---|---|---|
| 7,090,714 B2 * | 8/2006 | Otsubo et al. | .......... | 55/523 |
| 2005/0153099 A1 | 7/2005 | Yamada | | |
| 2006/0168927 A1 * | 8/2006 | Watanable et al. | .......... | 55/523 |

FOREIGN PATENT DOCUMENTS

| | | |
|---|---|---|
| EP | 2090414 | 8/2009 |
| JP | 2001-162121 | 6/2001 |
| JP | 2001-206778 | 7/2001 |
| JP | 2008-110894 | 5/2008 |
| JP | 2009-190022 | 8/2009 |
| WO | WO 03/093658 | 11/2003 |

OTHER PUBLICATIONS

Extended European Search Report for corresponding EP Application No. 10155990.4-2111, Jul. 26, 2010.
International Search Report for corresponding International Application No. PCT/JP2009/066025, Nov. 17, 2009.

* cited by examiner

*Primary Examiner* — Philip Tucker
*Assistant Examiner* — Alex Efta
(74) *Attorney, Agent, or Firm* — Ditthavong Mori & Steiner, P.C.

(57) ABSTRACT

A method for manufacturing a honeycomb structure includes molding a ceramic raw material to manufacture honeycomb molded bodies. The honeycomb molded bodies are fired to manufacture honeycomb fired bodies. End faces of at least two of the honeycomb fired bodies are joined interposing a joining material between the end faces to manufacture honeycomb joined bodies each having a length larger than a length of each honeycomb fired body. Side faces of the honeycomb joined bodies are bonded interposing an adhesive paste between the side faces to manufacture an aggregated body of the honeycomb joined bodies. The adhesive paste is dried and solidified to manufacture a honeycomb block including the aggregated body. The honeycomb block is separated at the joining material into at least two honeycomb blocks.

38 Claims, 18 Drawing Sheets

A-A line cross-sectional view

B-B line cross-sectional view

C-C line cross-sectional view

D-D line cross-sectional view

H-H line cross-sectional view

METHOD FOR MANUFACTURING HONEYCOMB STRUCTURE

CROSS-REFERENCE TO RELATED APPLICATIONS

The present application claims priority under 35 U.S.C. §119 to PCT/JP2009/066025 filed on Sep. 14, 2009, the contents of which are incorporated herein by reference in their entirety.

BACKGROUND OF THE INVENTION

1. Field of the Invention

The present invention relates to a method for manufacturing a honeycomb structure.

2. Discussion of the Background

Exhaust gases discharged from conventional internal combustion engines such as a diesel engine contain particulate matter (hereinafter, also referred to as PM), and in recent years, the PM has raised problems because it is harmful to the environment and the human bodies.

For this reason, various honeycomb filters such as a honeycomb filter including a porous ceramic honeycomb structure have been proposed as filters for capturing PM in exhaust gases and purifying the exhaust gases.

Further, in recent years, such a filter for purifying exhaust gases is desired to be downsized. For this reason, a small-sized honeycomb structure, that is, a honeycomb structure whose longitudinal length (hereinafter, also referred to simply as a length) is short, is desired.

Japanese Patent Application Publication (KOKAI) No. 2001-162121 discloses an aggregated body (a honeycomb structure) of ceramic filters in which a plurality of filters including a porous ceramic sintered body are integrated by bonding peripheral faces of the filters to one another with a sealing material layer interposed therebetween.

A honeycomb structure of this kind can be manufactured by the following method.

First, a ceramic powder, a binder, a dispersion medium solution and the like are mixed together to prepare a wet mixture.

Next, the wet mixture is extrusion-molded, and the extrusion-molded body is cut into a predetermined length to manufacture a pillar-shaped honeycomb molded body.

Thereafter, a plug material paste is injected to a predetermined end portion of each cell of the honeycomb molded body to seal each cell at either one end. Next, the honeycomb molded body with the plug material paste filled therein is degreased and fired to manufacture a porous ceramic sintered body (honeycomb fired body) to function as a filter.

Next, side faces of the plurality of honeycomb fired bodies are bonded to one another with a sealing material interposed therebetween to manufacture an aggregated body of the honeycomb fired bodies, and the sealing material is dried and solidified to form a sealing material layer, and thereby a honeycomb block formed by bonding the side faces of the plurality of honeycomb fired bodies to one another with the sealing material layer interposed therebetween is manufactured. Thereafter, as required, the periphery of the honeycomb block is cut and a coat layer is formed on the periphery of the honeycomb block to manufacture a honeycomb structure.

The contents of Japanese Patent Application Publication (KOKAI) No. 2001-162121 are incorporated herein by reference in their entirety.

SUMMARY OF THE INVENTION

According to one aspect of the present invention, a method for manufacturing a honeycomb structure includes molding a ceramic raw material to manufacture honeycomb molded bodies each having cell walls extending along a longitudinal direction of each of the honeycomb molded bodies to define cells between the cell walls. The honeycomb molded bodies are fired to manufacture honeycomb fired bodies. End faces of at least two of the honeycomb fired bodies are joined interposing a joining material between the end faces to manufacture honeycomb joined bodies each having a length larger than a length of each of the honeycomb fired bodies. Side faces of the honeycomb joined bodies are bonded interposing an adhesive paste between the side faces to manufacture an aggregated body of the honeycomb joined bodies. The adhesive paste is dried and solidified to manufacture a honeycomb block including the aggregated body of the honeycomb joined bodies. The honeycomb block is separated at a position of the joining material into at least two honeycomb blocks in which side faces of the plurality of honeycomb fired bodies are bonded to one another.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
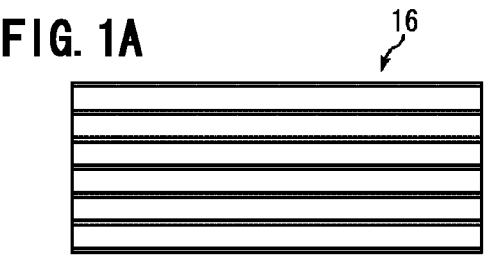
FIG. 1A is a cross-sectional view schematically showing an example of molding in a first embodiment of the present invention.

In the conventional method for manufacturing a honeycomb structure described in Japanese Patent Application Publication (KOKAI) No. 2001-162121, a honeycomb fired body having almost the same length as that of a honeycomb structure to be manufactured is manufactured, and side faces of the plurality of honeycomb fired bodies are bonded to one another to manufacture an aggregated body of the honeycomb fired bodies.

In such a conventional method for manufacturing a honeycomb structure, when a honeycomb structure is manufactured using the same number of honeycomb fired bodies, the time to manufacture an aggregated body of honeycomb fired bodies is not greatly influenced by the length of the honeycomb fired bodies. Therefore, an aggregated body of honeycomb fired bodies has to be manufactured many times in order to manufacture more honeycomb structures, resulting in an increase of manufacturing time.

In other words, in the conventional method for manufacturing a honeycomb structure described in Japanese Patent Application Publication (KOKAI) No. 2001-162121, problematically, the number of honeycomb structures which can be manufactured per unit time is less likely to be increased regardless of the length of the honeycomb structure to be manufactured.

Particularly, in a case where a honeycomb structure having a short length is manufactured, a method for manufacturing a honeycomb structure with efficiency is desired.

In a method for manufacturing a honeycomb structure according to an embodiment of the present invention, a honeycomb structure is more likely to be manufactured with efficiency.

The present inventors made intensive investigations concerning a method for manufacturing a honeycomb structure with efficiency. Consequently, they found that if a honeycomb joined body whose length is larger than that of one honeycomb fired body is manufactured by joining end faces of the honeycomb fired bodies to each other and then bonding in which an aggregated body of honeycomb joined bodies is manufactured using the honeycomb joined body is performed, the number of honeycomb structures, which can be manufactured per unit time, is more likely to be increased since it may become easier to collectively manufacture a plurality of aggregated bodies of the honeycomb fired bodies in one bonding.

A method for manufacturing a honeycomb structure according to the embodiment of the present invention includes: molding a ceramic raw material to manufacture a honeycomb molded body having a plurality of cells placed longitudinally in parallel with one another with a cell wall interposed therebetween; firing the honeycomb molded body to manufacture a honeycomb fired body; and manufacturing a honeycomb block including the plurality of honeycomb fired bodies, wherein the manufacturing of the honeycomb block includes: joining end faces of at least two honeycomb fired bodies to each other with a joining material interposed therebetween to manufacture a honeycomb joined body whose length is larger than a length of the one honeycomb fired body; bonding side faces of a plurality of honeycomb joined bodies to one another with an adhesive paste interposed therebetween to manufacture an aggregated body of the honeycomb joined bodies; drying and solidifying the adhesive paste to manufacture a honeycomb block including the aggregated body of the honeycomb joined bodies; and separating the honeycomb block including the aggregated body of the honeycomb joined bodies at a position of the joining material to give at least two honeycomb blocks in which side faces of the plurality of honeycomb fired bodies are bonded to one another.

As described above, in a conventional method for manufacturing a honeycomb structure, the number of the honeycomb structures, which can be manufactured per unit time, is almost constant regardless of the length of the honeycomb structure to be manufactured.

On the other hand, in the method for manufacturing a honeycomb structure according to the embodiment of the present invention, since it may become easier to collectively manufacture at least two aggregated bodies of honeycomb fired bodies in one bonding, the number of the honeycomb structures, which can be manufactured per unit time, is more likely to be increased. Therefore, the honeycomb structure is more likely to be manufactured with efficiency.

In the method for manufacturing a honeycomb structure according to the embodiment of the present invention, the joining material desirably includes a double-faced tape.

By using the double-faced tape as a joining material, it may become easier to securely join end faces of the honeycomb fired bodies to each other.

In the method for manufacturing a honeycomb structure according to the embodiment of the present invention, the joining material desirably further includes a cavity-holding member provided with the double-faced tape on both faces thereof.

When the joining material further contains the cavity-holding member, the honeycomb fired body is less prone to being damaged since the honeycomb fired bodies tend not to be brought into direct contact with one another in joining the end faces of the honeycomb fired bodies to each other.

In the method for manufacturing a honeycomb structure according to the embodiment of the present invention, the cavity-holding member is desirably flammable.

In the method for manufacturing a honeycomb structure according to the embodiment of the present invention, the flammable cavity-holding member may include a cardboard.

If the cavity-holding member is a flammable cavity-holding member (particularly, cardboard), it may become easier to burn out or carbonize the flammable cavity-holding member by heating it. Therefore, the honeycomb block including the aggregated body of the honeycomb joined bodies tends to be easily separated.

In the method for manufacturing a honeycomb structure according to the embodiment of the present invention, the cavity-holding member is desirably nonflammable.

Moreover, in the method for manufacturing a honeycomb structure according to the embodiment of the present invention, the nonflammable cavity-holding member may include a fibrous paper, an inorganic material sheet, a ceramic, a glass, or a metal.

In the method for manufacturing a honeycomb structure according to the embodiment of the present invention, it is desirable that in the drying and solidifying of the adhesive paste, the adhesive paste is dried and solidified, and simultaneously, at least one of the double-faced tape and the cavity-holding member is burnt out or carbonized.

At least one of the double-faced tape and the cavity-holding member is more likely to be burnt out or carbonized by heating the joining material. Therefore, at least one of the double-faced tape and the cavity-holding member is more likely to be removed from the honeycomb joined body. Consequently, it is easy to separate the honeycomb block including the aggregated body of the honeycomb joined bodies at a position of the joining material (a plane including the joining material).

In the method for manufacturing a honeycomb structure according to the embodiment of the present invention, it is less necessary to heat the joining material separately upon burning out or carbonizing at least one of the double-faced tape and the cavity-holding member since heat obtained upon drying and solidifying the adhesive paste is more likely to be utilized.

In the method for manufacturing a honeycomb structure according to the embodiment of the present invention, the joining material desirably includes a joining material paste containing an inorganic sol.

When the joining material paste used as the joining material contains an inorganic sol, since the end faces of the honeycomb fired bodies are more likely to be joined firmly to each other, the honeycomb fired bodies are more likely to be fixed to each other more securely.

In the method for manufacturing a honeycomb structure according to the embodiment of the present invention, the joining material paste desirably includes the same material as a material of the adhesive paste.

When the adhesive paste is used as the joining material paste, the honeycomb structure is more likely to be manufactured without preparing the joining material paste separately.

The method for manufacturing a honeycomb structure according to the embodiment of the present invention desirably further includes drying and solidifying the joining material paste, wherein the drying and solidifying of the joining material paste is performed prior to the bonding.

When drying and solidifying of the joining material paste is performed prior to bonding, a honeycomb joined body having end faces joined more firmly to each other is more likely to be manufactured. Therefore, when bonding is carried out using such a honeycomb joined body, there hardly arises the problem that the honeycomb joined body is separated during bonding and a position gap in the honeycomb fired bodies is generated.

In the method for manufacturing a honeycomb structure according to the embodiment of the present invention, it is desirable that in the drying and solidifying of the adhesive paste, the adhesive paste is dried and solidified, and simultaneously, the joining material paste is dried and solidified.

When the adhesive paste as well as the joining material paste is simultaneously dried and solidified, the honeycomb structure is more likely to be manufactured without drying and solidifying the joining material paste separately.

The method for manufacturing a honeycomb structure according to the embodiment of the present invention desirably further includes forming a coat layer, the forming a coat layer including: applying a coating material paste to a peripheral face of the honeycomb block including the aggregated body of the honeycomb joined bodies; and drying and solidifying the coating material paste, before the separating after the drying and solidifying of the adhesive paste.

If the coating material paste is applied to the peripheral face of the honeycomb block including an aggregated body of honeycomb joined bodies and dried and solidified, since it may become easier to collectively form a coat layer on at least two honeycomb blocks in one coat layer forming, a honeycomb structure is more likely to be manufactured with efficiency.

Further, in the method for manufacturing a honeycomb structure according to the embodiment of the present invention, the coating material paste is dried and solidified prior to the separating. Therefore, it may become easier to separate the honeycomb block including an aggregated body of honeycomb joined bodies in a configuration close to an end product at the position of the joining material.

In the method for manufacturing a honeycomb structure according to the embodiment of the present invention, in the separating, an external force is desirably applied to the honeycomb block including the aggregated body of the honeycomb joined bodies to separate the honeycomb block including the aggregated body of the honeycomb joined bodies at a position of the joining material.

By applying an external force such as vibration or bending to the honeycomb block including an aggregated body of honeycomb joined bodies by using a machine or a jig or by hand, the honeycomb block including the aggregated body of the honeycomb joined bodies is more likely to be separated more easily at the position of the joining material.

In the method for manufacturing a honeycomb structure according to the embodiment of the present invention, in the separating, a portion including the joining material is desirably cut along a plane in parallel with the end face of the honeycomb fired body.

By cutting the portion including the joining material along the plane in parallel with the end face of the honeycomb fired body, the joining material is more likely to be removed from the honeycomb joined body. Consequently, the honeycomb block including an aggregated body of honeycomb joined bodies is more likely to be separated at the position of the joining material.

The method for manufacturing a honeycomb structure according to the embodiment of the present invention desirably further includes sealing either one end of the cell by filling a plug material paste in the one end of the cell, after the manufacturing of the honeycomb molded body before the firing of the honeycomb molded body.

First Embodiment

Hereinafter, a first embodiment, which is an embodiment of a method for manufacturing a honeycomb structure of the present invention, will be described in reference to drawings. In the present embodiment, a method for manufacturing two honeycomb structures will be described.

Here, in the present description, a substance formed by bonding side faces of a plurality of honeycomb fired bodies to one another with an adhesive paste interposed therebetween is referred to as "an aggregated body of honeycomb fired bodies". Further, among the aggregated bodies of honeycomb fired bodies, the aggregated body of the honeycomb fired bodies in which the adhesive paste has been dried and solidified is referred to as "a honeycomb block". Moreover, among the honeycomb blocks, the honeycomb block which has been provided with a coat layer on a peripheral face thereof is referred to as "a honeycomb structure".

First, molding, in which a pillar-shaped honeycomb molded body having a plurality of cells placed longitudinally in parallel with one another with a cell wall interposed therebetween is manufactured by molding a ceramic raw material, is performed.

FIG. 1A to FIG. 1E are cross-sectional views each schematically showing a part of an example of a process for manufacturing a honeycomb structure in the first embodiment of the present invention.

FIG. 1A is a cross-sectional view schematically showing an example of molding in the first embodiment of the present invention.

Specifically, first, a silicon carbide powder as a ceramic powder is mixed with an organic binder, a liquid plasticizer, a lubricant and water to prepare a ceramic raw material (wet mixture) used for manufacturing a honeycomb molded body.

Next, the wet mixture is charged into an extruder and extrusion-molded, and the extrusion-molded body is then cut into a predetermined length to manufacture raw honeycomb molded bodies having a predetermined shape.

Subsequently, the raw honeycomb molded bodies are dried by using a microwave drying apparatus, a hot air drying apparatus, a dielectric drying apparatus, a reduced pressure drying apparatus, a vacuum drying apparatus, a freeze drying apparatus or the like to manufacture dried honeycomb molded bodies 16 illustrated in FIG. 1A.

Subsequently, sealing, in which a plug material paste is filled in either one end of a cell of the dried honeycomb molded body so as to seal the one end of a cell, is performed.

Figure 1B:
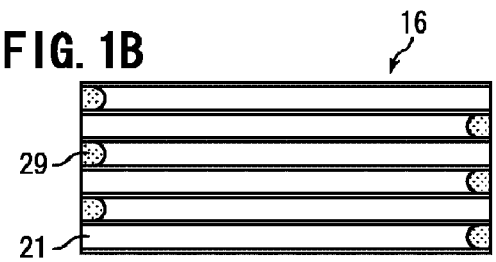
FIG. 1B is a cross-sectional view schematically showing an example of sealing in the first embodiment of the present invention.

FIG. 1B is a cross-sectional view schematically showing an example of sealing in the first embodiment of the present invention.

The dried honeycomb molded body 16 is subjected to sealing, in which a plug material paste 29 to be a plug is filled in either one end of a cell 21, to seal the cell 21.

Next, firing, in which a honeycomb fired body is manufactured by firing the sealed honeycomb molded body, is performed.

Figure 1C:
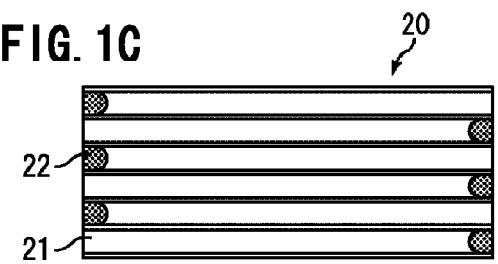
FIG. 1C is a cross-sectional view schematically showing an example of firing in the first embodiment of the present invention.

FIG. 1C is a cross-sectional view schematically showing an example of firing in the first embodiment of the present invention.

After sealing, degreasing, in which organic substances are removed by heating the organic substances in a degreasing furnace, is performed and then firing is performed to manufacture a honeycomb fired body 20 illustrated in FIG. 1C.

The plug material paste filled in the end portion of the cell is solidified by heating to become a plug 22.

As the conditions of cutting, drying, sealing, degreasing, and firing, conventional conditions employed in manufacturing a honeycomb fired body can be applied.

Next, with respect to the manufactured honeycomb fired body, joining is performed. In the joining, a honeycomb joined body whose length is larger than that of one honeycomb fired body is manufactured by joining end faces of two honeycomb fired bodies to each other with a joining material interposed therebetween.

Here, the end face of the honeycomb fired body refers to a face where a cell is present among faces of the honeycomb fired body.

In the present embodiment, a flammable cavity-holding member provided with double-faced tapes on both sides thereof is used as a joining material.

Figure 1D:
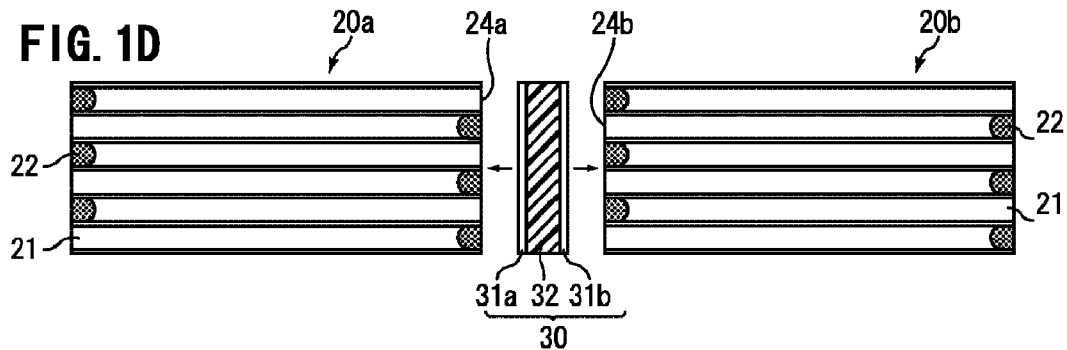
FIG. 1D and FIG. 1E are cross-sectional views schematically showing an example of joining in the first embodiment of the present invention.
Figure 1E:
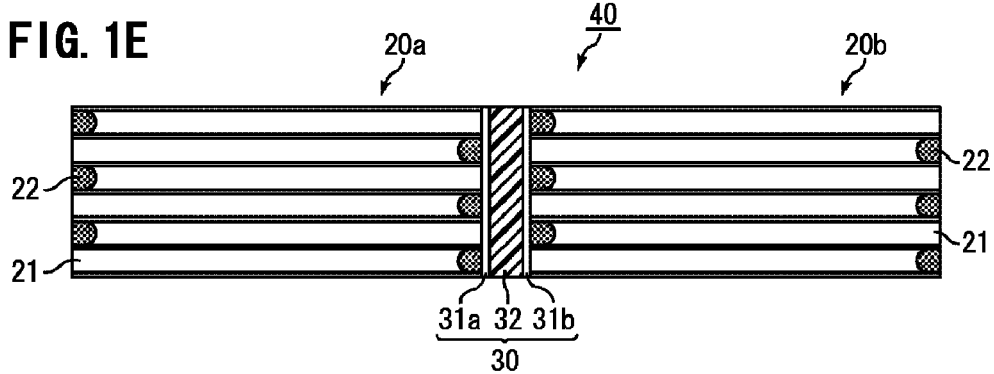

FIG. 1D and FIG. 1E are cross-sectional views schematically showing an example of joining in the first embodiment of the present invention.

First, a joining material 30 is manufactured by attaching the double-faced tapes 31a and 31b to both sides of the flammable cavity-holding member 32 as illustrated in FIG. 1D.

Next, an end face 24a of one honeycomb fired body 20a is bonded to one face of the flammable cavity-holding member 32 using the double-faced tape 31a. Then, an end face 24b of another honeycomb fired body 20b is bonded to the other face of the flammable cavity-holding member 32 using the double-faced tape 31b.

By such a method, as illustrated in FIG. 1E, a honeycomb joined body 40 whose length is larger than that of one honeycomb fired body 20a or 20b is manufactured.

As the double-faced tape, for example, an acrylic foam bonding tape, in which a base including a foam such as an acrylic foam is provided with an acrylic adhesive, or the like is used.

The thickness of the double-faced tape is desirably from about 0.1 mm to about 5.0 mm.

As the flammable cavity-holding member, for example, a cavity-holding member including cardboard or the like is used.

Here, the flammable cavity-holding member used herein refers to a cavity-holding member burnt out or carbonized at from about 100° C. to about 200° C.

Further, the thickness of the flammable cavity-holding member is desirably from about 1.0 mm to about 5.0 mm.

Here, "burning out" used herein means that most of organic substances disappear by heating, and "carbonizing" means that organic substances remain as carbon by heating, and "burning out or carbonizing" means that most of organic substances disappear, part of organic substances disappears and the rest of the organic substances remains as carbon, or most of organic substances remain as carbon.

Next, bonding, in which side faces of the plurality of honeycomb joined bodies are bonded to one another with the adhesive paste interposed therebetween to manufacture an aggregated body of the honeycomb joined bodies, is performed.

Figure 2:
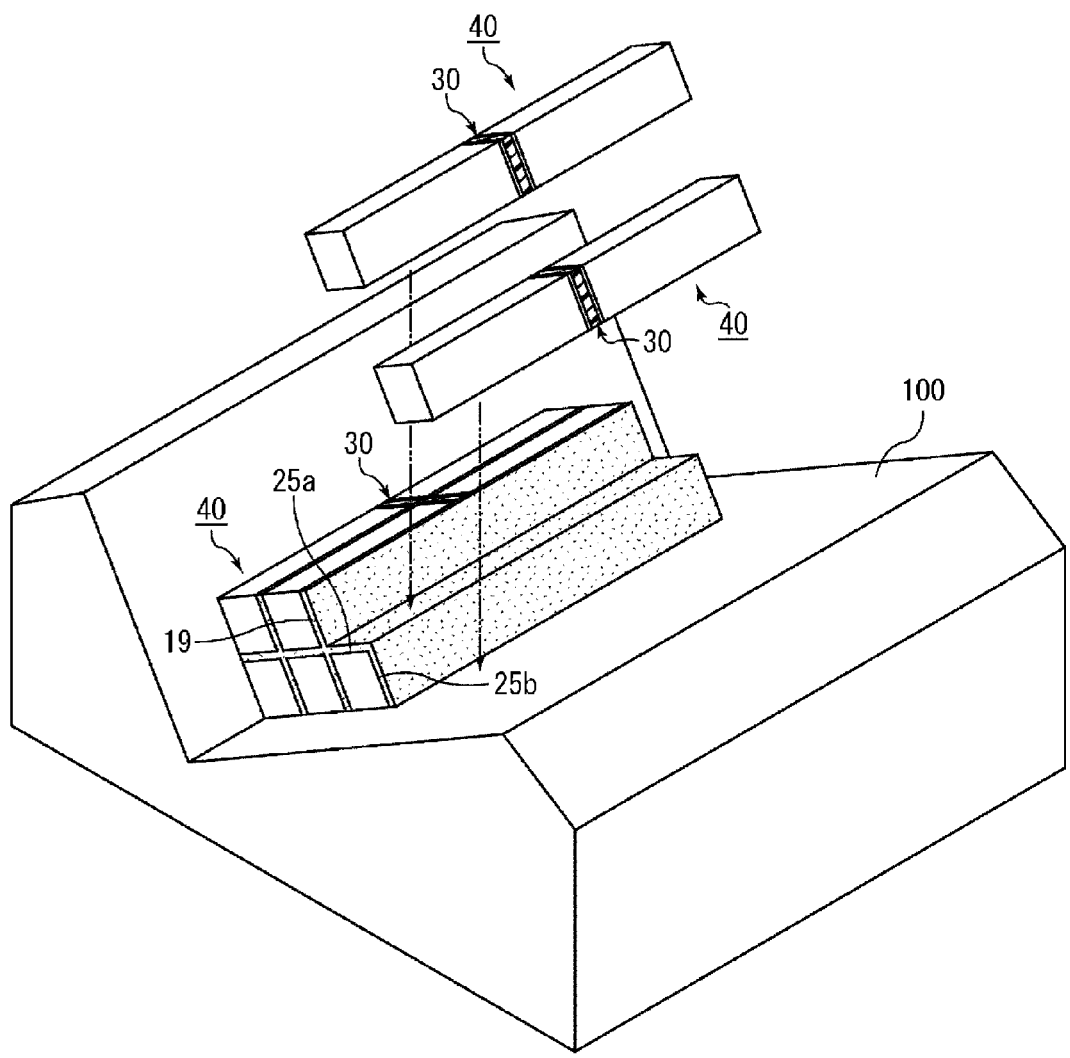
FIG. 2 is a perspective view schematically showing a part of an example of bonding in the first embodiment of the present invention.

FIG. 2 is a perspective view schematically showing a part of an example of bonding in the first embodiment of the present invention.

Figure 3A:
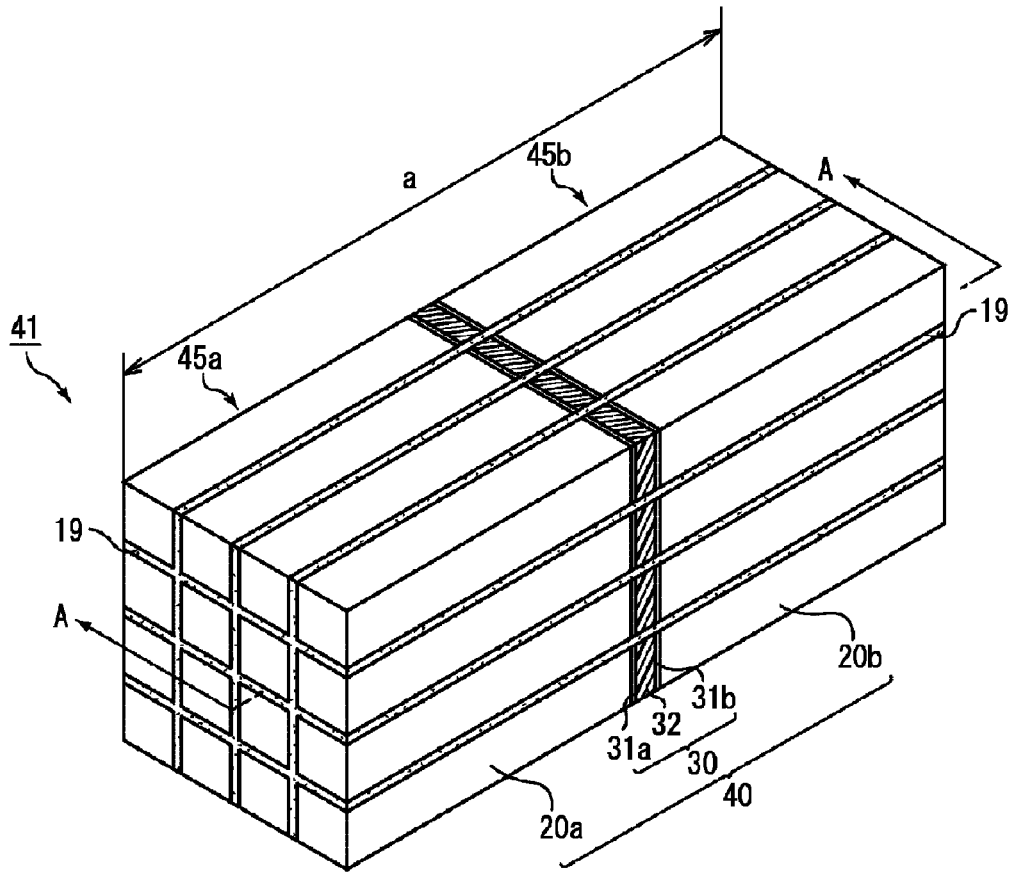
FIG. 3A is a perspective view schematically showing a part of an example of bonding in the first embodiment of the present invention.
Figure 3B:
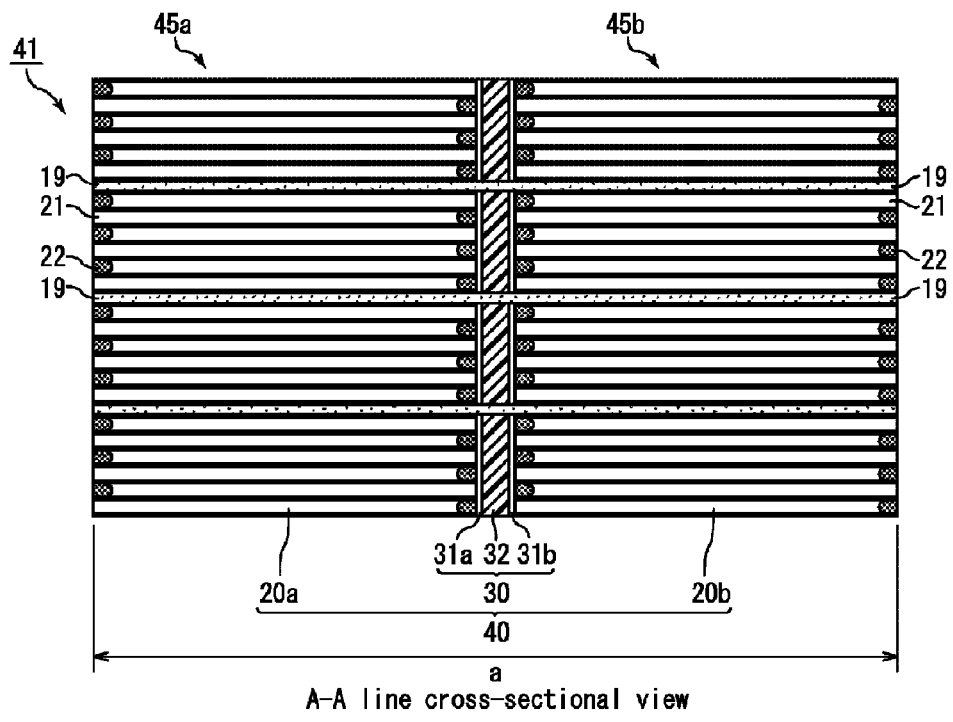
FIG. 3B is a cross-sectional view taken on line A-A of FIG. 3A.

FIG. 3A is a perspective view schematically showing a part of an example of bonding in the first embodiment of the present invention, and FIG. 3B is a cross-sectional view taken on line A-A of FIG. 3A.

In bonding, for example, as illustrated in FIG. 2, first, a honeycomb joined body 40 is placed obliquely on a stand 100 in which a top face is inclined like a letter V so that the honeycomb joined body 40 can be obliquely piled up. Thereafter, an adhesive paste 19 is applied in a uniform thickness to two upturned side faces 25a and 25b of the honeycomb joined body 40. In this time, the adhesive paste 19 is also applied onto the joining material 30. Then, another honeycomb joined body 40 is piled up in turn on the adhesive paste 19 and this operation is repeated.

By the above method, as illustrated in FIG. 3A and FIG. 3B, an aggregated body 41 of the honeycomb joined bodies, formed by applying an adhesive paste 19 to the side face of the honeycomb joined body 40, is manufactured.

In FIG. 3A and FIG. 3B, an aggregated body 41 of honeycomb joined bodies including 16 honeycomb joined bodies (vertically 4 bodies and laterally 4 bodies) 40 is manufactured.

That is, in the aggregated body 41 of the honeycomb joined bodies, an aggregated body 45a of honeycomb fired bodies, which is formed by bonding side faces of 16 honeycomb fired bodies (vertically 4 bodies and laterally 4 bodies) 20a to one another with the adhesive paste 19 interposed therebetween, and an aggregated body 45b of honeycomb fired bodies, which is formed by bonding side faces of 16 honeycomb fired bodies (vertically 4 bodies and laterally 4 bodies) 20b to one another with the adhesive paste 19 interposed therebetween, are coupled with each other in a longitudinal direction (direction of an arrow "a" in FIG. 3A and FIG. 3B) through a part of the adhesive paste 19 and a joining material 30 (a joining material is bonded to a cell wall of the honeycomb fired body).

As the an adhesive paste, for example, a paste containing inorganic fibers such as alumina fibers, inorganic particles such as silicon carbide, and inorganic binders such as silica sol is used. The adhesive paste may further contain whiskers.

Subsequently, drying and solidifying, in which the aggregated body of the honeycomb joined bodies is heated at a temperature of from about 100° C. to about 200° C. for from about 15 minutes to about 240 minutes to dry and solidify the adhesive paste to manufacture a honeycomb block including an aggregated body of the honeycomb joined bodies, is performed.

Here, in the present description, an aggregated body of the honeycomb joined bodies whose adhesive paste is dried and solidified is referred to as a "honeycomb block including an aggregated body of the honeycomb joined bodies". Therefore, the honeycomb block used herein includes both a honeycomb block including an aggregated body of the honeycomb joined bodies (in a state of pre-separating) and a honeycomb block (in a state of post-separating of the honeycomb block including an aggregated body of the honeycomb joined bodies).

Figure 4A:
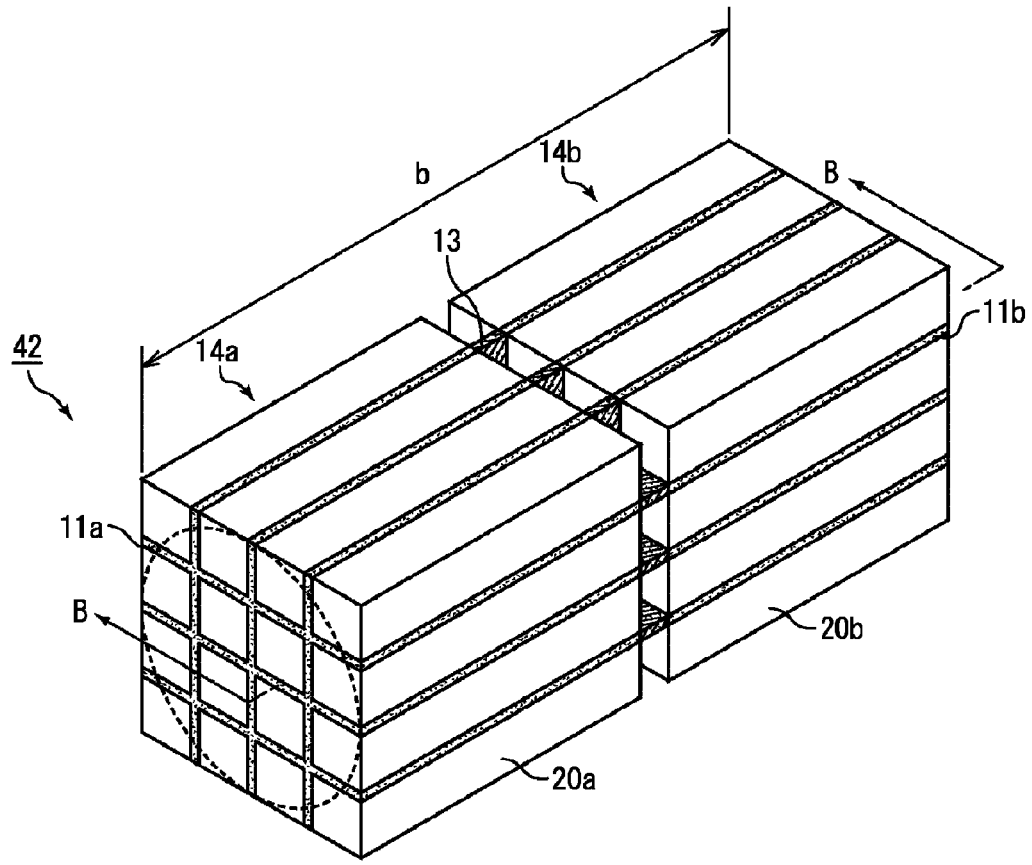
FIG. 4A is a perspective view schematically showing an example of drying and solidifying in the first embodiment of the present invention.
Figure 4B:
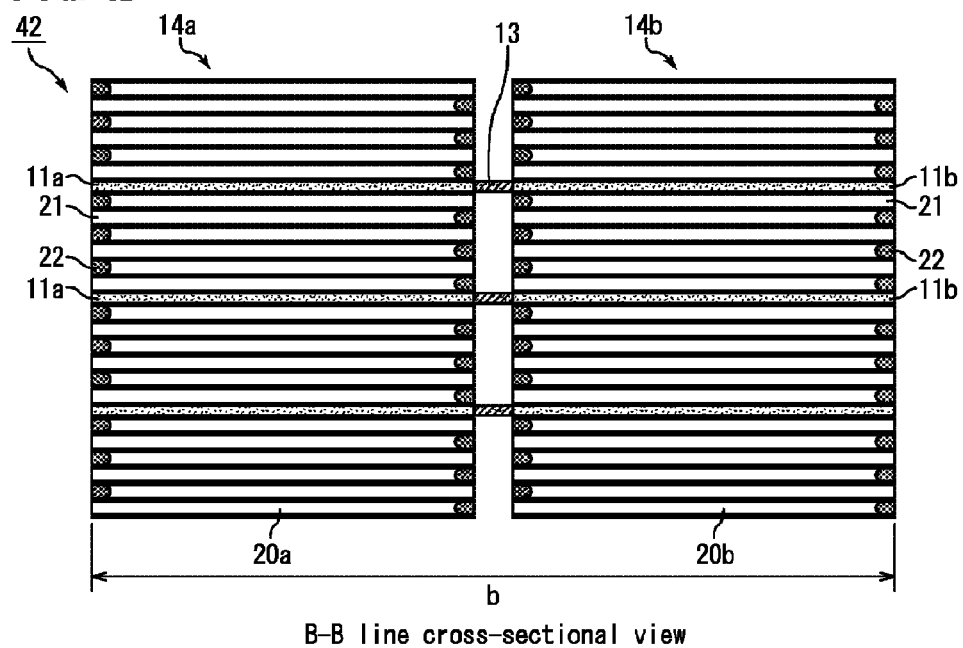
FIG. 4B is a cross-sectional view taken on line B-B of FIG. 4A.

FIG. 4A is a perspective view schematically showing an example of drying and solidifying in the first embodiment of the present invention, and FIG. 4B is a cross-sectional view taken on line B-B of FIG. 4A.

By drying and solidifying the adhesive paste, an adhesive layer 11a is formed between the side faces of the honeycomb fired body 20a and an adhesive layer 11b is formed between the side faces of the honeycomb fired body 20b. Further, by drying and solidifying the adhesive paste, a coupling portion 13, which is connected to the adhesive layer 11a and the adhesive layer 11a and couples the adhesive layer 11a with the adhesive layer 11b, is formed.

In the present embodiment, the adhesive paste is dried and solidified, and simultaneously by heating at this time, the double-faced tape and the flammable cavity-holding member composing the joining material were burnt out or carbonized. Further, the aggregated body of honeycomb joined bodies may be degreased after drying and solidifying the adhesive paste to burn out or carbonize the double-faced tape and the flammable cavity-holding member composing the joining material.

As illustrated in FIG. 4A and FIG. 4B, in the honeycomb block 42 including the aggregated body of honeycomb joined bodies, a honeycomb block 14a, which is formed by bonding side faces of 16 honeycomb fired bodies (vertically 4 bodies and laterally 4 bodies) 20a to one another with the adhesive layer 11a interposed therebetween, and a honeycomb block 14b, which is formed by bonding side faces of 16 honeycomb fired bodies (vertically 4 bodies and laterally 4 bodies) 20b to one another with the adhesive layer 11b interposed therebetween, are coupled with each other in a longitudinal direction (direction of an arrow "b" in FIG. 4A and FIG. 4B) through a coupling portion 13.

Here, in the honeycomb block 42 including an aggregated body of honeycomb joined bodies illustrated in FIG. 4A and FIG. 4B, since the double-faced tape and the flammable cavity-holding member composing the joining material are burnt out or carbonized, the honeycomb joined body does not exist. However, in the present description, the honeycomb block 42 including an aggregated body of honeycomb joined bodies illustrated in FIG. 4A and FIG. 4B is also "a honeycomb block including an aggregated body of honeycomb joined bodies".

Thereafter, periphery cutting, in which the honeycomb block including an aggregated body of honeycomb joined bodies is cut, is performed.

Figure 5A:
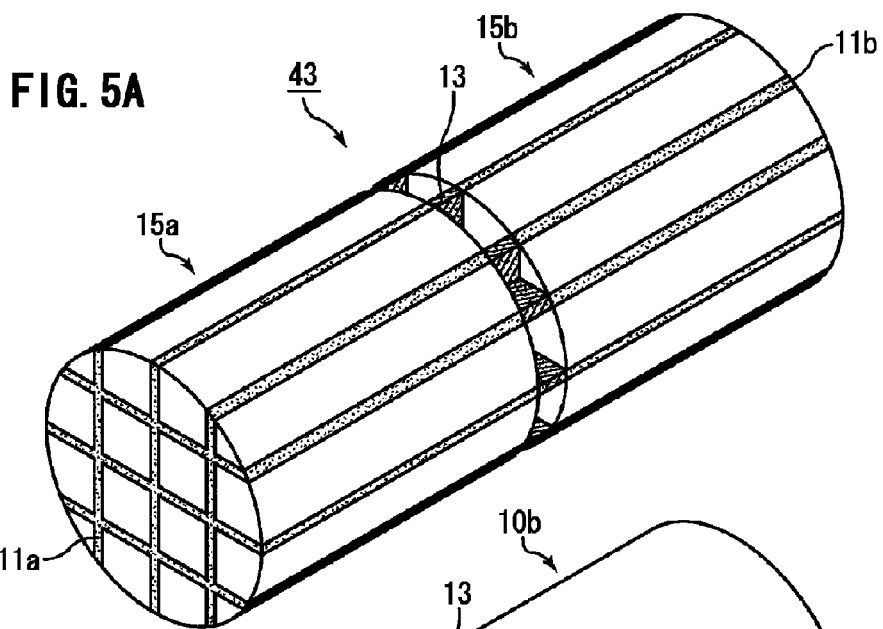
FIG. 5A is a perspective view schematically showing an example of periphery cutting in the first embodiment of the present invention.
Figure 5B:
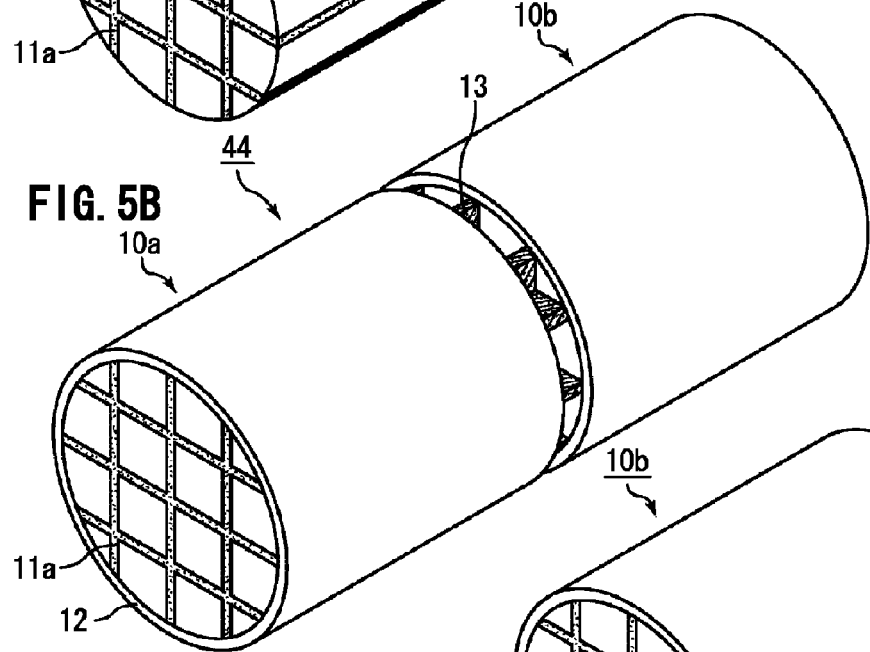
FIG. 5B is a perspective view schematically showing an example of coat layer forming in the first embodiment of the present invention.
Figure 5C:
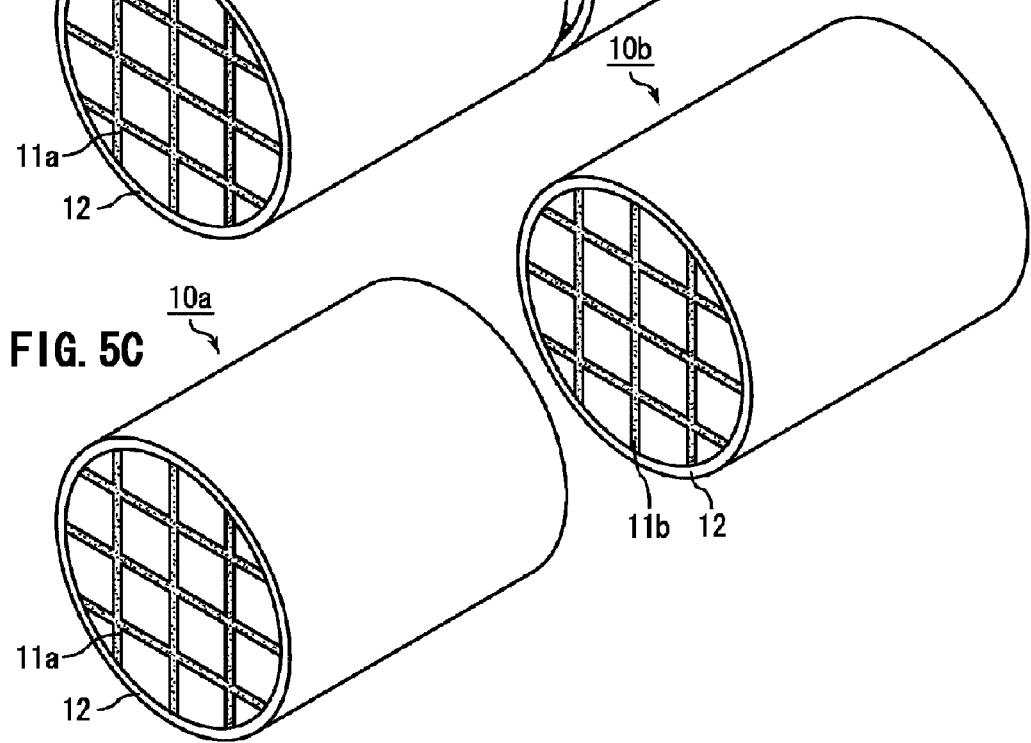
FIG. 5C is a perspective view schematically showing an example of separating in the first embodiment of the present invention.

FIG. 5A to FIG. 5C are perspective views schematically showing a part of an example of a process for manufacturing a honeycomb structure in the first embodiment of the present invention.

FIG. 5A is a perspective view schematically showing an example of periphery cutting in the first embodiment of the present invention.

A honeycomb block 43, whose periphery is cut and which includes an aggregated body of honeycomb joined bodies, is manufactured by cutting the honeycomb block including an aggregated body of honeycomb joined bodies along a broken line in FIG. 4A with a diamond cutter or the like.

As illustrated in FIG. 5A, in the honeycomb block 43, whose periphery is cut and which includes an aggregated body of honeycomb joined bodies, honeycomb blocks 15a and 15b, whose peripheries are each cut, are coupled with each other through a coupling portion 13.

Subsequently, coat layer forming, in which a coat layer is formed by applying a coating material paste to a peripheral face of the honeycomb block, whose periphery is cut and which includes an aggregated body of honeycomb joined bodies, and by drying and solidifying the coating material paste, is performed.

FIG. 5B is a perspective view schematically showing an example of coat layer forming in the first embodiment of the present invention.

First, the coating material paste is applied to a peripheral face of the honeycomb block, whose periphery is cut and which includes an aggregated body of honeycomb joined bodies.

Next, the coating material paste is dried and solidified at from about 80° C. to about 130° C. for from about 5 minutes to about 60 minutes to manufacture a honeycomb structure 44 including an aggregated body of honeycomb joined bodies, in which a coat layer 12 is formed on a peripheral face.

As illustrated in FIG. 5B, in the honeycomb structure 44 including an aggregated body of honeycomb joined bodies, the honeycomb structures 10a and 10b are coupled with each other through a coupling portion 13.

Here, a paste including the same material as that of the adhesive paste is used as the coating material paste.

Then, separating, in which the honeycomb structure including an aggregated body of honeycomb joined bodies is separated at a position of the joining material into two honeycomb structures, is performed.

FIG. 5C is a perspective view schematically showing an example of separating in the first embodiment of the present invention.

A coupling portion 13 fixing the honeycomb structure including an aggregated body of honeycomb joined bodies illustrated in FIG. 5B is broken by hand or the like. A residue (carbonized substance of an organic substance in the joining material) of the coupling portion, which adheres to an end face (vicinity of an end portion of a cell wall) is removed with a brush, a high-pressure water stream, or the like. The honeycomb structure 44 including an aggregated body of honeycomb joined bodies is separated into two honeycomb structures 10a and 10b.

The coupling portion is formed by drying and solidifying the an adhesive paste, but the thickness of the coupling portion is small and an amount thereof is also small, and therefore it is more likely to be readily broken off by hand or the like.

Examples of a method for breaking off the coupling portion by hand include methods of bending by hand, twisting by hand, and pulling by hand and the like. The coupling portion may be similarly broken off using a machine.

By the procedure described above, two honeycomb structures can be manufactured.

Next, the honeycomb structure manufactured by the method for manufacturing a honeycomb structure of the present embodiment will be described in reference to drawings.

Figure 6:
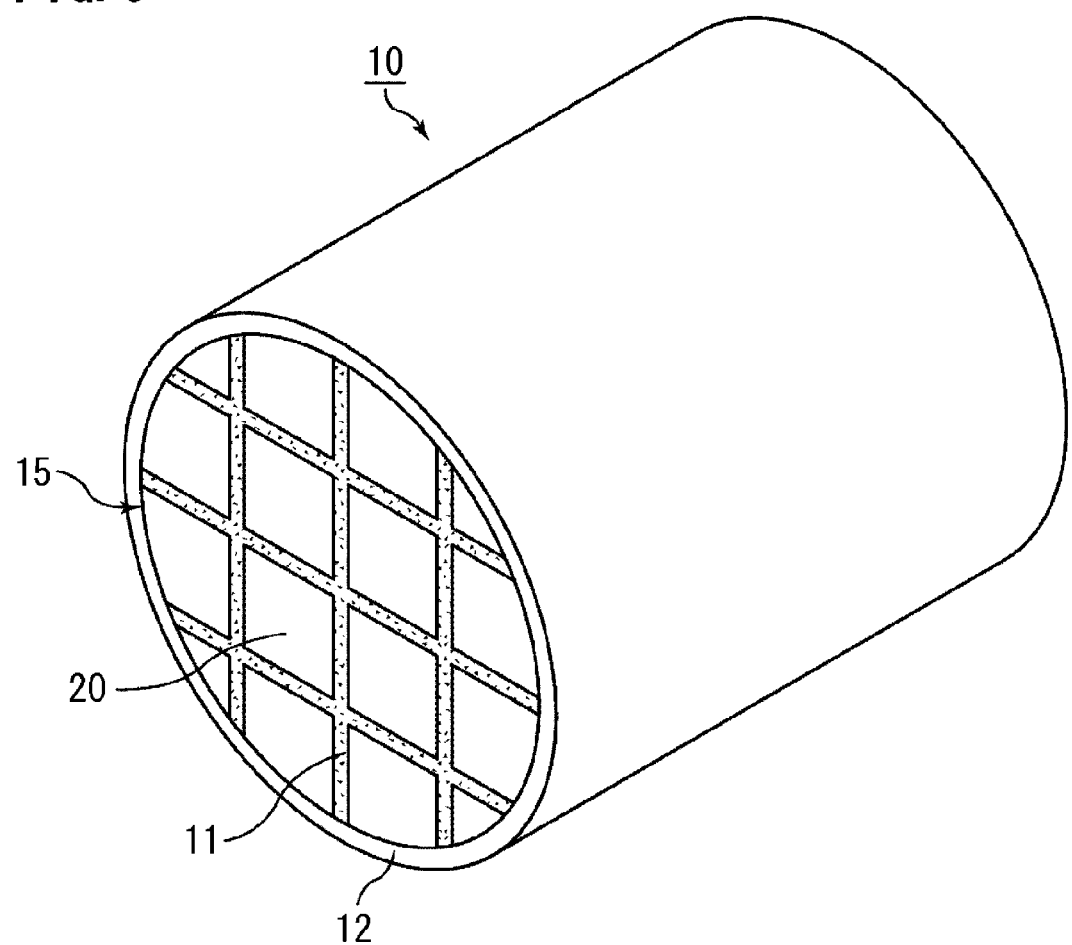
FIG. 6 is a perspective view schematically showing an example of a honeycomb structure manufactured by a method for manufacturing a honeycomb structure according to the embodiment of the present invention.

FIG. 6 is a perspective view schematically showing an example of the honeycomb structure manufactured by the method for manufacturing a honeycomb structure according to the embodiment of the present invention.

Figure 7A:
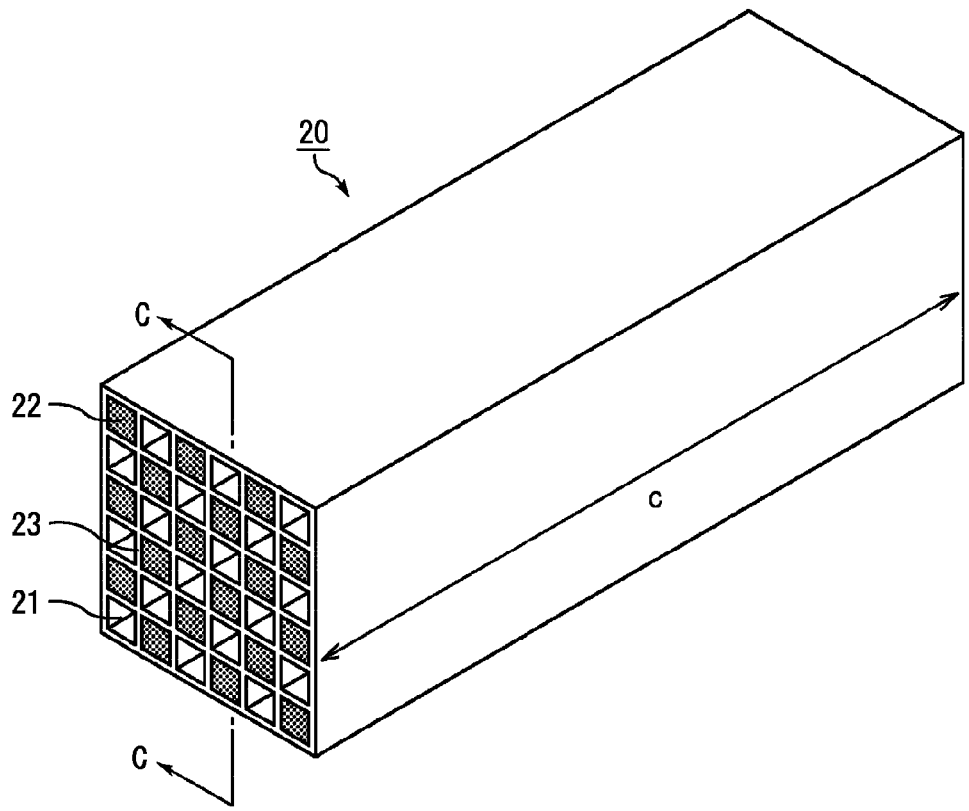
FIG. 7A is a perspective view schematically showing an example of a honeycomb fired body according to the embodiment of the present invention.
Figure 7B:
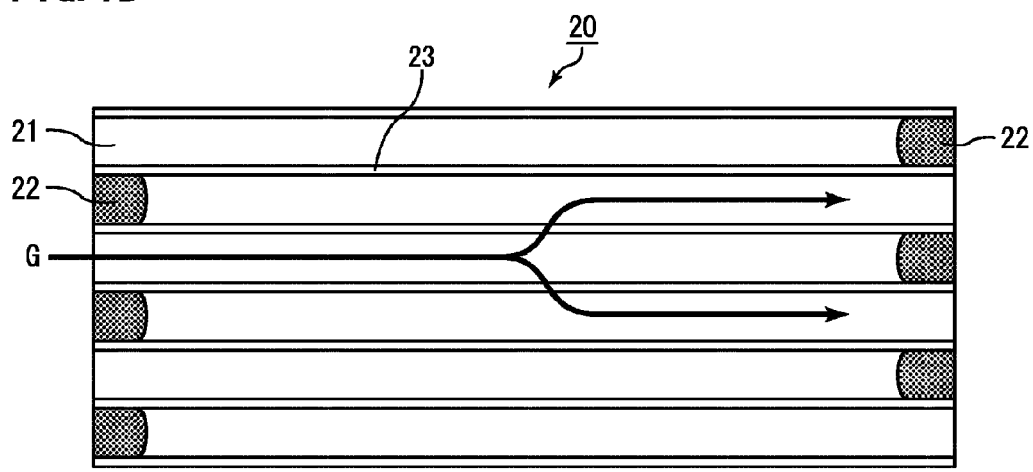
FIG. 7B is a cross-sectional view taken on line C-C of FIG. 7A.

FIG. 7A is a perspective view schematically showing an example of the honeycomb fired body according to the embodiment of the present invention, and FIG. 7B is a cross-sectional view taken on line C-C of FIG. 7A.

In the honeycomb structure 10, as illustrated in FIG. 6, a plurality of honeycomb fired bodies 20 are bound with the adhesive layer 11 interposed therebetween to construct a honeycomb block 15, and a coat layer 12 is formed on a peripheral face of the honeycomb block 15.

The honeycomb fired body 20 has a shape illustrated in FIG. 7A and FIG. 7B.

In the honeycomb fired body 20 illustrated in FIG. 7A and FIG. 7B, a plurality of cells 21 are placed longitudinally (in a direction indicated by an arrow "c" in FIG. 7A) in parallel with one another with a cell wall 23 interposed therebetween, and either end of the cell 21 is sealed with a plug 22. Therefore, exhaust gases "G", which have flown into the cell 21 opened at one end face, surely pass through the cell wall 23 interposed between cells 21 and flow out of another cell 21 opened at the other end face.

Therefore, the cell wall 23 functions as a filter for capturing PM and the like.

Further, the honeycomb structure can be used for an exhaust gas purifying apparatus to purify the exhaust gases exhausted from an internal combustion engine.

Hereinafter, the effects of the method for manufacturing a honeycomb structure of the present embodiment will be described.

(1) In the method for manufacturing a honeycomb structure of the present embodiment, after manufacturing a honeycomb joined body whose length is larger than that of one honeycomb fired body by joining end faces of at least two honeycomb fired bodies to each other with a joining material interposed therebetween, bonding, in which an aggregated body of honeycomb joined bodies is manufactured using the honeycomb joined body, is performed. Accordingly, since it may become easier to collectively manufacture at least two aggregated bodies of honeycomb fired bodies in one bonding, the number of honeycomb structures, which can be manufactured per unit time, is more likely to be increased. Therefore, the honeycomb structure is more likely to be manufactured with efficiency.

(2) In the method for manufacturing a honeycomb structure of the present embodiment, a flammable cavity-holding member provided with double-faced tapes on both sides thereof is used as a joining material.

When the joining material includes a double-faced tape, it may become easier to join end faces of honeycomb fired bodies to each other securely.

Further, when the joining material contains the flammable cavity-holding member, the honeycomb fired body is less prone to being damaged because the honeycomb fired bodies tend not to be brought into direct contact with one another in joining end faces of the honeycomb fired bodies to each other.

(3) In the method for manufacturing a honeycomb structure of the present embodiment, the adhesive paste is dried and solidified, and simultaneously, at least one of the double-faced tape and the flammable cavity-holding member is burnt out or carbonized.

At least one of the double-faced tape and the flammable cavity-holding member is more likely to be burnt out or carbonized by heating the joining material. Therefore, at least one of the double-faced tape and the cavity-holding member is more likely to be removed from the honeycomb joined body. Consequently, it is easy to separate the honeycomb structure including an aggregated body of honeycomb joined bodies at a position of the joining material.

Further, in the method for manufacturing a honeycomb structure of the present embodiment, it is less necessary to heat the joining material separately upon burning out or carbonizing at least one of the double-faced tape and the cavity-holding member since heat obtained upon drying and solidifying the adhesive paste is more likely to be utilized.

(4) In the honeycomb block including an aggregated body of honeycomb joined bodies manufactured by the method for manufacturing a honeycomb structure of the present embodiment, at least two honeycomb blocks are coupled with each other through a coupling portion.

The thickness of the coupling portion is small and an amount thereof is also small, and therefore it is more likely to be broken off by hand or the like. Consequently, the honeycomb structure (honeycomb block) including an aggregated body of honeycomb joined bodies is more likely to be easily separated at a position of the joining material.

(5) In the method for manufacturing a honeycomb structure of the present embodiment, coat layer forming, in which a coating material paste is applied to a peripheral face of the honeycomb block including an aggregated body of honeycomb joined bodies and dried and solidified, is performed before separating after drying and solidifying of the adhesive paste.

A honeycomb structure is more likely to be manufactured with efficiency since it may become easier to collectively form a coat layer on at least two honeycomb blocks in one coat layer forming by applying a coating material paste to a peripheral face of the honeycomb block including an aggregated body of honeycomb joined bodies and drying and solidifying the coating material paste.

Further, since the coating material paste is dried and solidified prior to the separating, it may become easier to separate the honeycomb structure (honeycomb block) including an aggregated body of honeycomb joined bodies in a configuration close to an end product at a position of the joining material.

Hereinafter, an example which discloses the first embodiment of the present invention more specifically will be shown, and the present invention is not limited to this example.

EXAMPLE 1

(1) An amount of 52.8% by weight of a silicon carbide coarse powder having an average particle diameter of 22 μm and an amount of 22.6% by weight of a silicon carbide fine powder having an average particle diameter of 0.5 μm were mixed. To the obtained mixture were added 2.1% by weight of an acrylic resin, 4.6% by weight of an organic binder (methyl cellulose), 2.8% by weight of a lubricant (UNILUB, manufactured by NOF Corp.), 1.3% by weight of glycerin, and 13.8% by weight of water, and then mixed and kneaded to give a wet mixture. The wet mixture was extrusion-molded, and the molded wet mixture was cut to give raw honeycomb molded bodies having almost the same shape as that illustrated in FIG. 7A and FIG. 7B with the cells unsealed. Next, the raw honeycomb molded bodies were dried by using a microwave drying apparatus to manufacture honeycomb molded bodies.

A plug material paste having the same composition as in the raw honeycomb molded body was injected in predetermined cells of the honeycomb molded body to seal the cells.

The honeycomb molded body in which cells were sealed was placed on a firing jig, and then degreased at a temperature of 400° C. Thereafter, the honeycomb molded body was fired at a temperature of 2200° C. under a normal-pressure argon atmosphere for 3 hours to manufacture a honeycomb fired body made of a silicon carbide sintered body. The manufactured honeycomb fired body had a porosity of 45%, an average pore diameter of 15 μm, a size of 34.3 mm×34.3 mm×101.6 mm (4 inches), the number of cells (cell density) of 46.5 pcs/cm$^2$ (300 pcs/inch$^2$) and the thickness of a cell wall of 0.25 mm (10 mil).

Next, a joining material (thickness: 3.8 mm) was manufactured by attaching double-faced tapes (acrylic foam bonding tape, adhesive: acrylic, base: acrylic foam, thickness: 0.40 mm) to both sides of a flammable cavity-holding member (thickness: 3.0 mm) including cardboard.

Then, as illustrated in FIG. 1D, an end face of one honeycomb fired body manufactured was bonded to one side of the flammable cavity-holding member with the double-faced tape. Next, an end face of another honeycomb fired body was bonded to the other side of the flammable cavity-holding member with the double-faced tape.

By the above method, as illustrated in FIG. 1E, a honeycomb joined body in which two honeycomb fired bodies were joined with a joining material including a double-faced tape and a flammable cavity-holding member interposed therebetween was manufactured.

Next, an adhesive paste containing 30.0% by weight of an alumina fiber having an average fiber length of 20 μm and an average fiber diameter of 4 μm, 21% by weight of a silicon carbide powder having an average particle diameter of 0.6 μm, 15% by weight (solid content: 30% by weight) of silica sol, 5.6% by weight of carboxymethyl cellulose and 28.4% by weight of water was prepared.

Then, by use of a method illustrated in FIG. 2, an aggregated body of the honeycomb joined bodies, as illustrated in FIG. 3A, was manufactured by applying an adhesive paste to side faces of honeycomb joined bodies and bonding 16 of the honeycomb joined bodies (vertically 4 bodies and laterally 4 bodies) to one another with the adhesive paste interposed therebetween. Furthermore, the aggregated body of the honeycomb joined bodies was heated at 180° C. for 45 minutes to dry and solidify the adhesive paste, and thereafter was degreased (700° C., 40 minutes) to burn out or carbonize the joining material. Thereby, a honeycomb block including an aggregated body of honeycomb joined bodies, which was provided with an adhesive layer and a coupling portion, each having a thickness of 1.0 mm, and has a rectangular pillar shape, as illustrated in FIG. 4A was manufactured.

In the honeycomb block including an aggregated body of honeycomb joined bodies manufactured, two honeycomb blocks are coupled with each other through a coupling portion.

Subsequently, a honeycomb block, whose periphery is cut into a round pillar shape and which includes an aggregated body of honeycomb joined bodies, as illustrated in FIG. 5A, was manufactured by cutting a periphery of the honeycomb block including an aggregated body of honeycomb joined bodies using a diamond cutter.

Next, a coating material paste was applied to a peripheral face of the honeycomb block, whose periphery is cut into a round pillar shape and which includes an aggregated body of honeycomb joined bodies, to form a coating material paste layer. Then, the coating material paste layer was dried and solidified at 120° C. for 60 minutes to form a coat layer, and thereby, a honeycomb structure including an aggregated body of honeycomb joined bodies, which has a round pillar shape of 143.8 mm in diameter and 207.0 mm in length and is provided with a coat layer on a peripheral face thereof as illustrated in FIG. 5B, was manufactured.

Here, a paste having the same composition as that of the adhesive paste was used as the coating material paste.

Then, a coupling portion fixing the honeycomb structure including an aggregated body of honeycomb joined bodies was broken off by hand, and a residue (carbonized substance of an organic substance in the joining material) of the coupling portion, which adheres to an end face (vicinity of an end portion of a cell wall) is removed with a brush. Thereby, the honeycomb structure including an aggregated body of honeycomb joined bodies was separated into two honeycomb structures.

By the procedure described above, two honeycomb structures having a round pillar shape of 143.8 mm in diameter and 101.6 mm in length, as illustrated in FIG. 5C, were manufactured.

In Example 1, the number of honeycomb structures, which can be manufactured per unit time, tends to be more than that in a conventional method for manufacturing a honeycomb structure, and characteristics (pressure loss and capture efficiency) of the manufactured honeycomb structure are almost at the same level as those of the honeycomb structure manufactured by the conventional method for manufacturing a honeycomb structure.

Second Embodiment

Hereinafter, a second embodiment, which is an embodiment of a method for manufacturing a honeycomb structure of the present invention, will be described.

The method for manufacturing a honeycomb structure of the present embodiment is different from that of the first embodiment of the present invention in that as a joining material, a flammable cavity-holding member is not used and only a double-faced tape is used.

In the present embodiment, end faces of two honeycomb fired bodies are joined to each other using a double-faced tape thicker than that used in the first embodiment of the present invention to manufacture a honeycomb joined body.

Specifically, a double-faced tape having a thickness of from about 1.0 mm to about 5.0 mm is used as a joining material.

In the present embodiment, the effects (1), (4) and (5) described in the first embodiment of the present invention can be exerted, and the following effect can be exerted.

(6) In the method for manufacturing a honeycomb structure of the present embodiment, manufacturing of the joining material is easy since only the double-faced tape is used as a joining material.

Hereinafter, an example which discloses the second embodiment of the present invention more specifically will be shown, and the present invention is not limited to this example.

EXAMPLE 2

First, by using the same method as in Example 1, a honeycomb fired body made of a silicon carbide sintered body was manufactured. The honeycomb fired body had a porosity of 45%, an average pore diameter of 15 μm, a size of 34.3 mm×34.3 mm×101.6 mm (4 inches), the number of cells (cell density) of 46.5 pcs/cm$^2$ (300 pcs/inch$^2$) and the thickness of a cell wall of 0.25 mm (10 mil).

Next, a honeycomb joined body in which two honeycomb fired bodies were joined with a joining material including a double-faced tape interposed therebetween was manufactured by joining end faces of two honeycomb fired bodies to each other using a double-faced tape (acrylic foam bonding tape, adhesive: acrylic, base: acrylic foam, thickness: 2.0 mm).

Next, an aggregated body of honeycomb joined bodies was manufactured by using the same method as in Example 1.

Subsequently, under the same conditions as in Example 1, the aggregated body of the honeycomb joined bodies was heated to dry and solidify the adhesive paste, and thereafter was degreased (700° C., 40 minutes) to burn out or carbonize the double-faced tape. Thereby, a honeycomb block including an aggregated body of honeycomb joined bodies, which was provided with an adhesive layer and a coupling portion, each having a thickness of 1.0 mm, and has a rectangular pillar shape, was manufactured.

Subsequently, a periphery of the honeycomb block including an aggregated body of honeycomb joined bodies was cut into a round pillar shape as with Example 1. Then, as with Example 1, a coat layer was formed on a peripheral face of the honeycomb block, whose periphery is cut into a round pillar shape and which includes an aggregated body of honeycomb joined bodies, and thereby, a honeycomb structure including an aggregated body of honeycomb joined bodies was manufactured.

Thereafter, as with Example 1, a coupling portion fixing the honeycomb structure including an aggregated body of honeycomb joined bodies was broken off by hand, and a residue (a carbonized substance of an organic substance in the joining material) of the coupling portion, which adheres to an end face (vicinity of an end portion of a cell wall) is removed with a brush. Thereby, the honeycomb structure including an aggregated body of honeycomb joined bodies was separated into two honeycomb structures.

By the procedure described above, two honeycomb structures having a round pillar shape of 143.8 mm in diameter and 101.6 mm in length were manufactured.

In Example 2, the number of honeycomb structures, which can be manufactured per unit time, tends to be more than that in a conventional method for manufacturing a honeycomb structure, and characteristics (pressure loss and capture efficiency) of the manufactured honeycomb structure are almost at the same level as those of the honeycomb structure manufactured by the conventional method for manufacturing a honeycomb structure.

Third Embodiment

Hereinafter, a third embodiment, which is an embodiment of a method for manufacturing a honeycomb structure of the present invention, will be described in reference to drawings.

The method for manufacturing a honeycomb structure of the present embodiment is different from that of the first embodiment of the present invention in that a joining material paste containing inorganic sol is used as a joining material, and in a method for separating.

The thickness of the joining material paste is desirably from about 1.0 mm to about 5.0 mm.

FIG. 8A to FIG. 8E are cross-sectional views schematically showing a part of an example of a process for manufacturing a honeycomb structure in the third embodiment of the present invention.

Figure 8A:
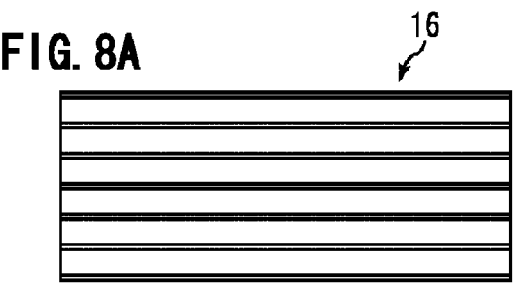
FIG. 8A is a cross-sectional view schematically showing an example of molding in a third embodiment of the present invention.
Figure 8B:
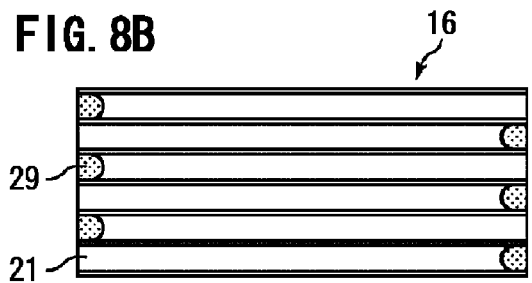
FIG. 8B is a cross-sectional view schematically showing an example of sealing in the third embodiment of the present invention.
Figure 8C:
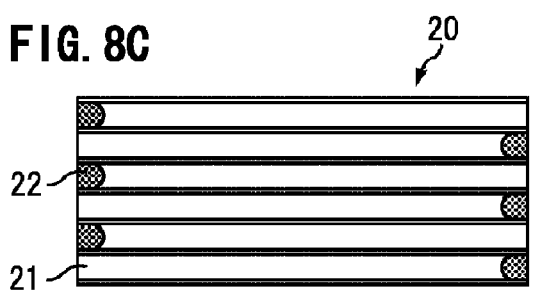
FIG. 8C is a cross-sectional view schematically showing an example of firing in the third embodiment of the present invention.

FIG. 8A is a cross-sectional view schematically showing an example of molding in the third embodiment of the present invention. Further, FIG. 8B is a cross-sectional view schematically showing an example of sealing in the third embodiment of the present invention. Moreover, FIG. 8C is a cross-sectional view schematically showing an example of firing in the third embodiment of the present invention.

First, as illustrated in FIG. 8A, as with the first embodiment of the present invention, a honeycomb molded body 16 is manufactured. Next, as illustrated in FIG. 8B, a plug material paste 29 is filled in either one end of a cell 21. Thereafter, as illustrated in FIG. 8C, the honeycomb molded body 16 is fired to manufacture a honeycomb fired body 20.

Next, joining, in which end faces of two honeycomb fired bodies are joined to each other by the following method, is performed.

In the present embodiment, a joining material paste containing inorganic sol is used as a joining material. Here, a paste including the same material as that of the adhesive paste used in the first embodiment of the present invention is used as a joining material paste.

Figure 8D:
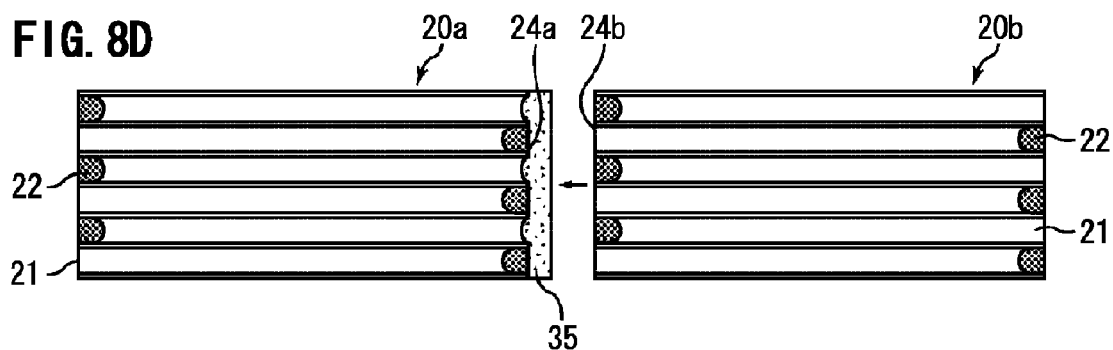
FIG. 8D and FIG. 8E are cross-sectional views schematically showing an example of joining in the third embodiment of the present invention.
Figure 8E:
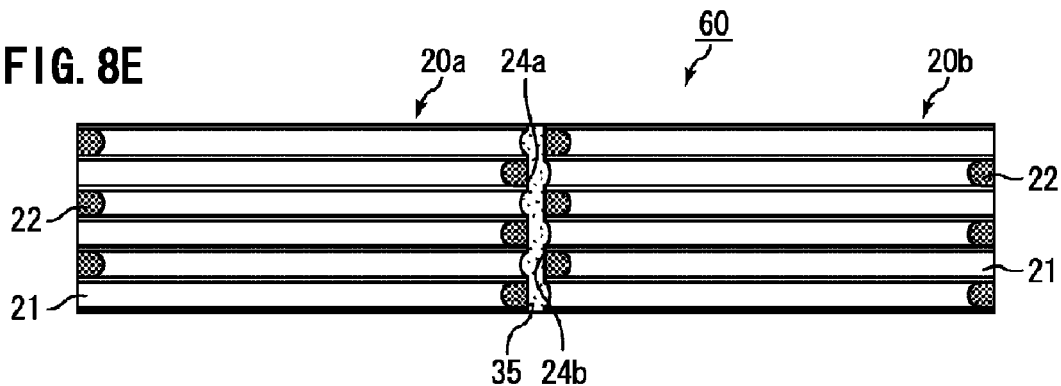

FIG. 8D and FIG. 8E are cross-sectional views schematically showing an example of joining in the third embodiment of the present invention.

As illustrated in FIG. 8D, a joining material paste 35 is applied to an end face 24a of one honeycomb fired body 20a. Next, an end face 24b of another honeycomb fired body 20b is bonded to the joining material paste 35.

By such a method, a honeycomb joined body 60 illustrated in FIG. 8E is manufactured.

Further, when the joining material paste 35 is applied to both the end face 24a of the honeycomb fired body 20a and the end face 24b of the honeycomb fired body 20b, as illustrated in FIG. 8E, apart of the joining material paste 35 tends to penetrate into the cell 21 where an end portion is not sealed.

The joining material paste 35 penetrated into the cell 21 is more likely to be removed by cutting it together with the joining material in separating described later. Accordingly, in the present embodiment, in consideration of the length of the honeycomb fired body to be cut, it is desirable to manufacture the honeycomb fired body, whose length is larger than that of a honeycomb structure to be manufactured.

Next, bonding, in which, as with the first embodiment of the present invention, side faces of the plurality of honeycomb joined bodies are bonded to one another with the adhesive paste interposed therebetween to manufacture an aggregated body of the honeycomb joined bodies, is performed.

Subsequently, drying and solidifying, in which under the same conditions as in the first embodiment of the present invention, the aggregated body of the honeycomb joined bodies is heated to dry and solidify the adhesive paste as well as the joining material paste to manufacture a honeycomb block including an aggregated body of the honeycomb joined bodies, is performed. Here, degreasing may be performed after drying and solidifying the adhesive paste.

Figure 9A:
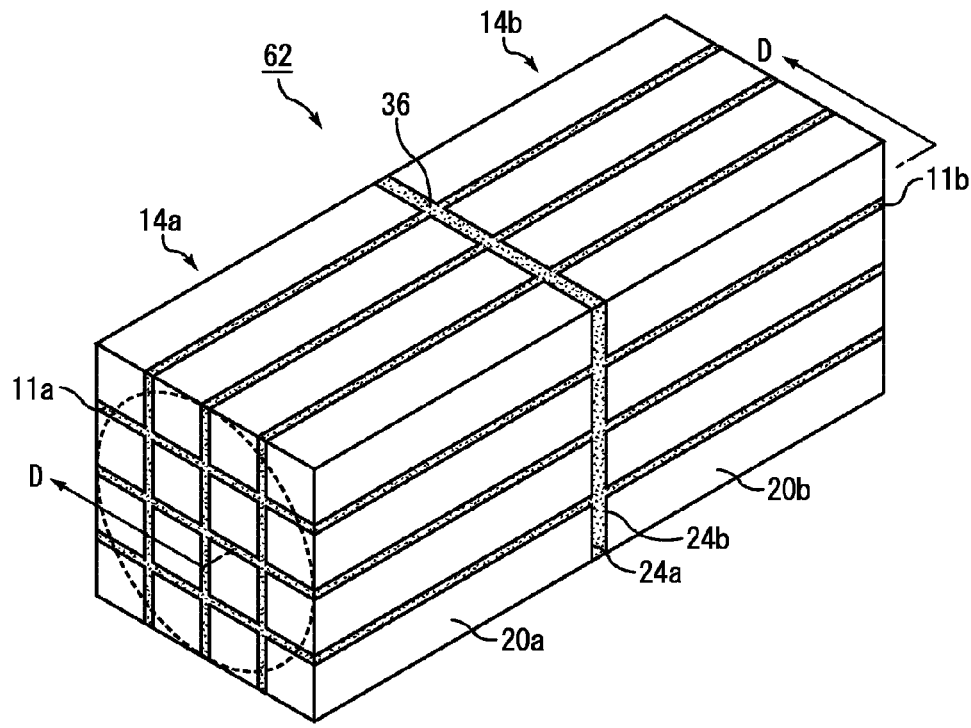
FIG. 9A is a perspective view schematically showing an example of drying and solidifying in the third embodiment of the present invention.
Figure 9B:
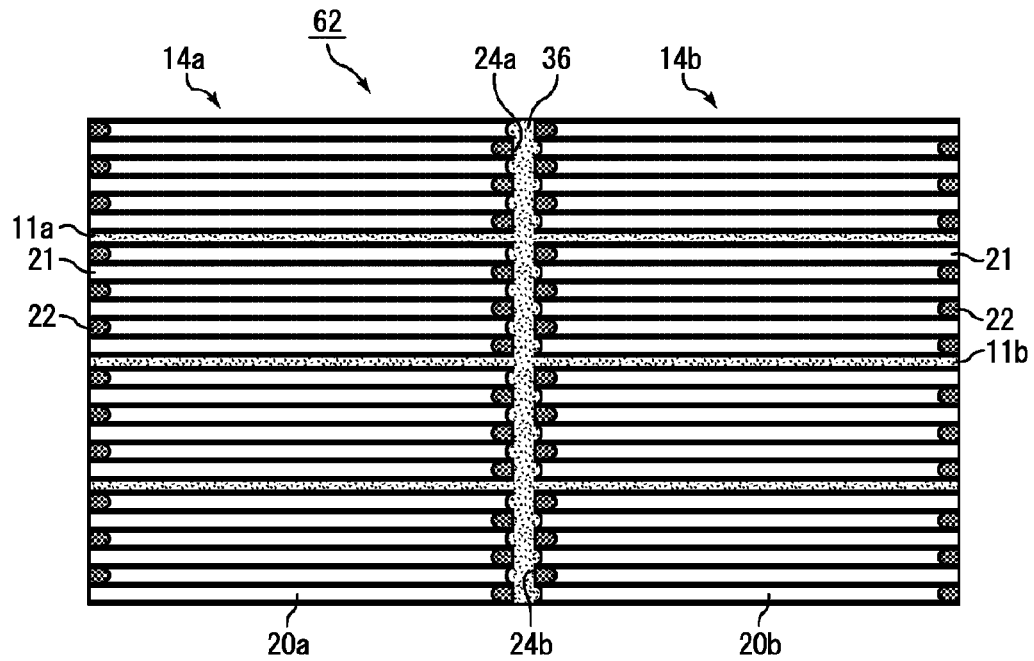
FIG. 9B is a cross-sectional view taken on line D-D of FIG. 9A.

FIG. 9A is a perspective view schematically showing an example of drying and solidifying in the third embodiment of the present invention, and FIG. 9B is a cross-sectional view taken on line D-D of FIG. 9A.

As with the first embodiment of the present invention, an adhesive layer 11a is formed between the side faces of the honeycomb fired body 20a and an adhesive layer 11b is formed between the side faces of the honeycomb fired body 20b by drying and solidifying the adhesive paste.

Further, a joining material layer 36 is formed between the end face 24a of the honeycomb fired body 20a and the end face 24b of the honeycomb fired body 20b by drying and solidifying the joining material paste.

As described above, in the honeycomb block 62 including an aggregated body of honeycomb joined bodies, as illustrated in FIG. 9A and FIG. 9B, a honeycomb block 14a, which is formed by bonding side faces of 16 honeycomb fired bodies (vertically 4 bodies and laterally 4 bodies) 20a to one another with the adhesive layer 11a interposed therebetween, and a honeycomb block 14b, which is formed by bonding side faces of 16 honeycomb fired bodies (vertically 4 bodies and laterally 4 bodies) 20b to one another with the adhesive layer 11b interposed therebetween, are joined to each other through a joining material layer 36.

Since the joining material layer 36 is formed between the end face 24a of the honeycomb fired body 20a and the end face 24b of the honeycomb fired body 20b, the joining material layer 36 tends to join the honeycomb blocks to one another more securely than the coupling portion formed in the first embodiment of the present invention.

Figure 10A:
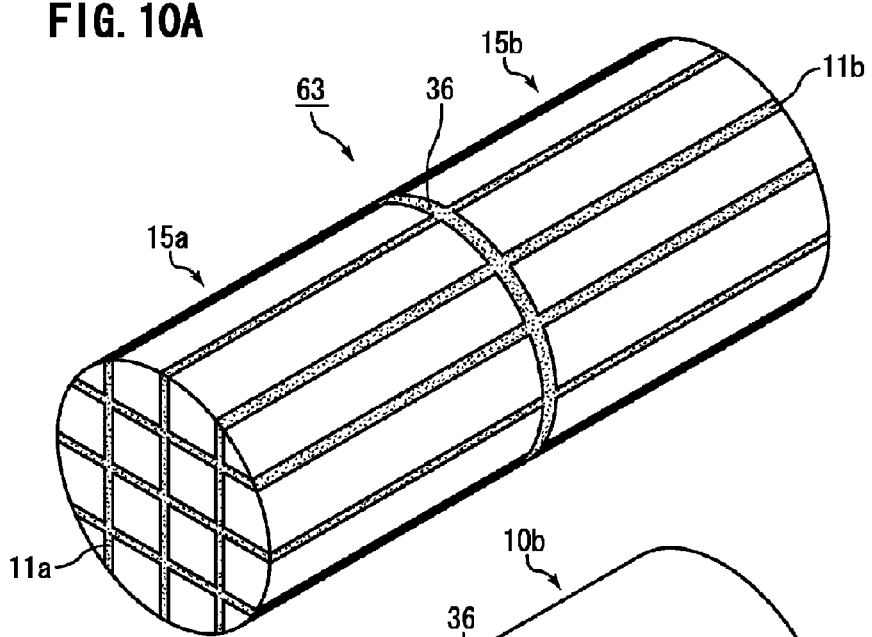
FIG. 10A is a perspective view schematically showing an example of periphery cutting in the third embodiment of the present invention.
Figure 10B:
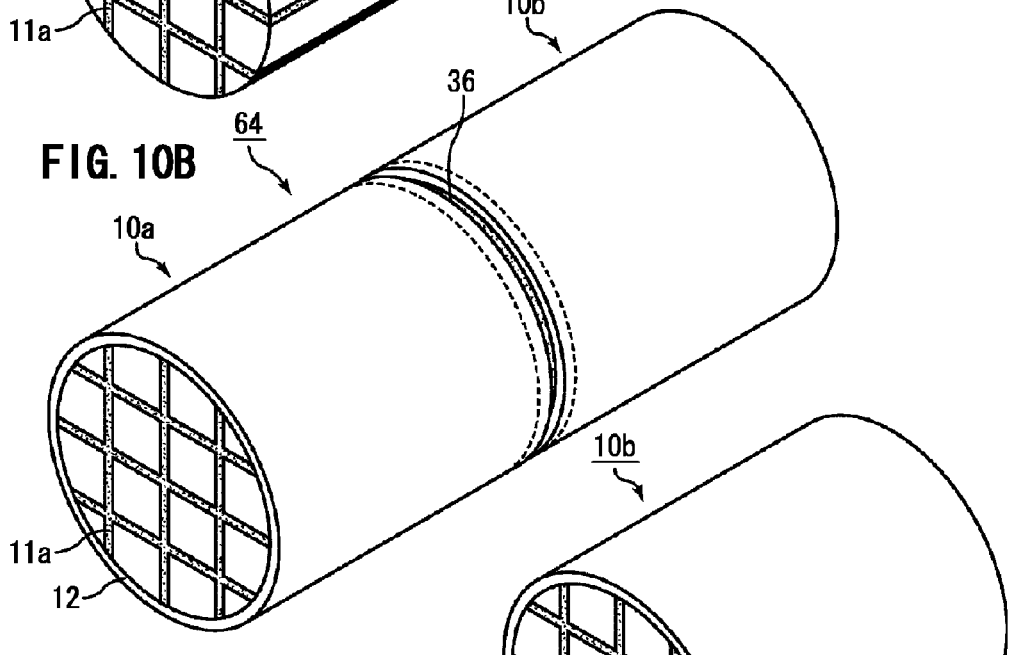
FIG. 10B is a perspective view schematically showing an example of coat layer forming in the third embodiment of the present invention.
Figure 10C:
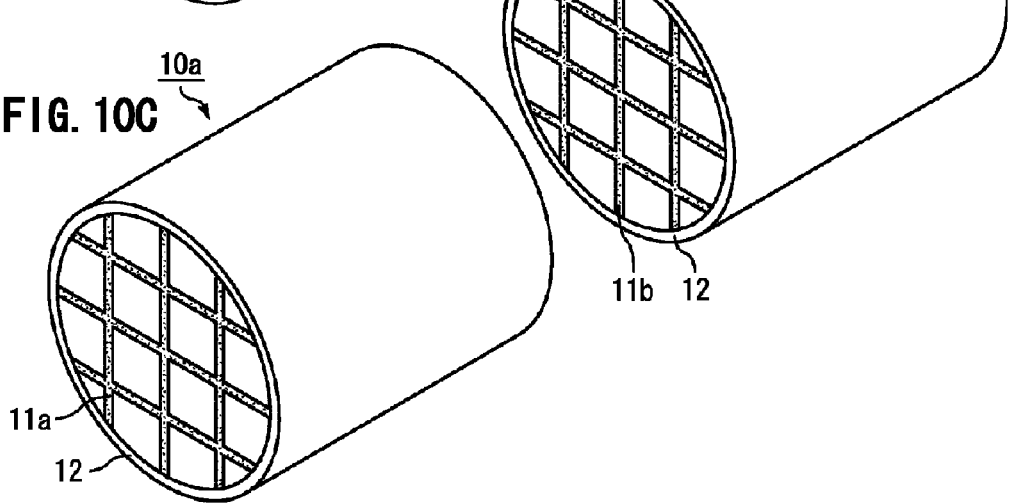
FIG. 10C is a perspective view schematically showing an example of separating in the third embodiment of the present invention.

FIG. 10A to FIG. 10C are perspective views schematically showing a part of an example of a process for manufacturing a honeycomb structure in the third embodiment of the present invention.

FIG. 10A is a perspective view schematically showing an example of periphery cutting in the third embodiment of the present invention. FIG. 10B is a perspective view schematically showing an example of coat layer forming in the third embodiment of the present invention.

As illustrated in FIG. 10A, after a honeycomb block including an aggregated body of honeycomb joined bodies is manufactured, a honeycomb block 63, whose periphery is cut and which includes an aggregated body of honeycomb joined bodies, is manufactured as with the first embodiment of the present invention. Thereafter, as illustrated in FIG. 10B, a coat layer 12 is formed on a peripheral face of the honeycomb block, whose periphery is cut and which includes an aggregated body of honeycomb joined bodies, and thereby, a honeycomb structure 64 including an aggregated body of honeycomb joined bodies is manufactured.

Then, separating, in which the honeycomb structure including an aggregated body of honeycomb joined bodies is separated at a position of the joining material into two honeycomb structures, is performed.

FIG. 10C is a perspective view schematically showing an example of separating in the third embodiment of the present invention.

By cutting a portion (portion indicated by a broken line in FIG. 10B) including the joining material layer 36 in the honeycomb structure including an aggregated body of honeycomb joined bodies illustrated in FIG. 10B along a plane in parallel with the end face of the honeycomb fired body, the honeycomb structure including an aggregated body of honeycomb joined bodies is separated into two honeycomb structures 10a and 10b, as illustrated in FIG. 10C.

By the procedure described above, two honeycomb structures 10a and 10b can be manufactured.

Hereinafter, separating of the honeycomb block including an aggregated body of honeycomb joined bodies in the present embodiment will be specifically described.

Figure 11:
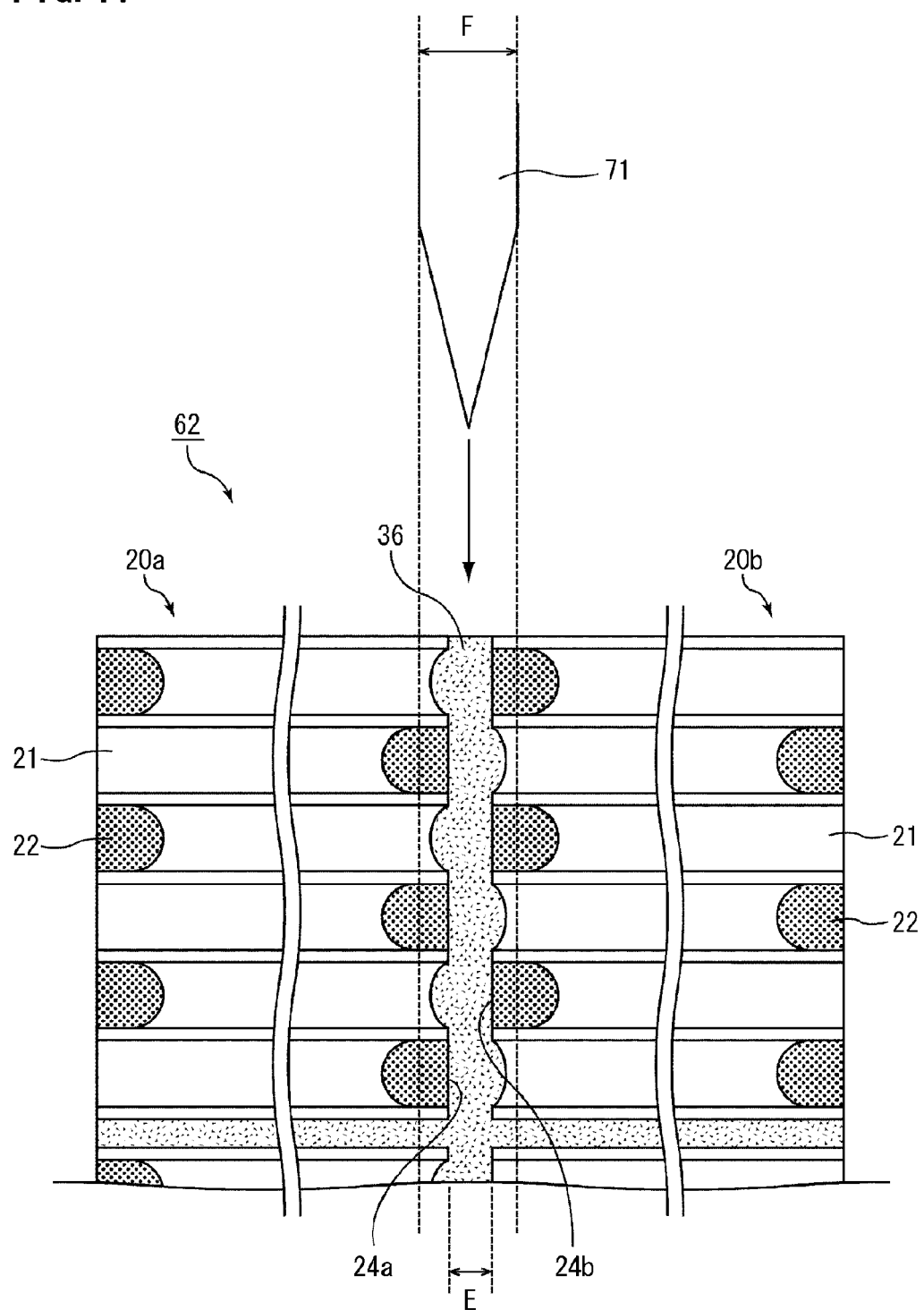
FIG. 11 is an enlarged partial cross-sectional view schematically showing an example of a method for cutting a honeycomb block including an aggregated body of honeycomb joined bodies according to the embodiment of the present invention.

FIG. 11 is an enlarged partial cross-sectional view schematically showing an example of a method for cutting a honeycomb block including an aggregated body of honeycomb joined bodies according to the embodiment of the present invention.

As illustrated in FIG. 11, the honeycomb block 62 including an aggregated body of honeycomb joined bodies is cut so as to include the joining material layer 36 using a blade 71 having the thickness (indicated by a double-pointed arrow "F" in FIG. 11) larger than a distance (indicated by a double-pointed arrow "E" in FIG. 11) between an end face 24a of the honeycomb fired body 20a and an end face 24b of the honeycomb fired body 20b, which are joined to each other. Thereby, the honeycomb block 62 including an aggregated body of honeycomb joined bodies can be separated into two honeycomb blocks.

Further, by this method, the joining material layer 36 penetrated into the cell 21 can be removed since a portion, which is located at a certain distance from the end face 24a of the honeycomb fired body 20a or the end face 24b of the honeycomb fired body 20b (boundary face between the joining material layer 36 and the honeycomb fired body 20a or the honeycomb fired body 20b), is cut and removed.

The honeycomb block including an aggregated body of honeycomb joined bodies is cut by using, for example, a diamond cutter, an outer diameter diamond grinder, an inner diameter diamond grinder, a multi-wire, a multi-blade, a water jet, a high-pressure washing machine or the like.

In the present embodiment, the effects (1) and (5) described in the first embodiment of the present invention can be exerted, and the following effects can be exerted.

(7) In the method for manufacturing a honeycomb structure of the present embodiment, a joining material paste containing inorganic sol is used as a joining material. When the joining material paste contains inorganic sol, since end faces of honeycomb fired bodies are more likely to be joined firmly to each other, the honeycomb fired bodies are more likely to be fixed to each other more securely.

(8) In the method for manufacturing a honeycomb structure of the present embodiment, the joining material paste includes the same material as that of an adhesive paste. When the adhesive paste is used as the joining material paste, a honeycomb structure is more likely to be manufactured without preparing the joining material paste separately.

Honeycomb blocks including an aggregated body of honeycomb joined bodies manufactured in the present embodiment are fixed to each other more securely than honeycomb blocks including an aggregated body of honeycomb joined bodies manufactured in the first embodiment of the present invention. Further, since the honeycomb blocks including an aggregated body of honeycomb joined bodies manufactured in the present embodiment are fixed to each other more securely than honeycomb blocks including an aggregated body of honeycomb joined bodies manufactured in the first embodiment of the present invention, a coat layer in the present embodiment is more likely to be formed more easily than that in the first embodiment of the present invention.

Hereinafter, an example which discloses the third embodiment of the present invention more specifically will be shown, and the present invention is not limited to this example.

EXAMPLE 3

First, by using the same method as in Example 1, a honeycomb fired body made of a silicon carbide sintered body was manufactured. The honeycomb fired body had a porosity of 45%, an average pore diameter of 15 μm, a size of 34.3 mm×34.3 mm×102.6 mm, the number of cells (cell density) of 46.5 pcs/cm$^2$ (300 pcs/inch$^2$) and the thickness of a cell wall of 0.25 mm (10 mil).

In consideration of a portion to be cut in separating, the honeycomb fired body, whose length is larger by 1.0 mm than that of a honeycomb structure to be manufactured, was manufactured.

Next, as illustrated in FIG. 8D, a joining material paste was applied to an end face of one honeycomb fired body manufactured. Next, an end face of another honeycomb fired body was bonded to the joining material paste.

Here, a paste including the same material as that of the adhesive paste used in Example 1 was used as the joining material paste.

By the above method, a honeycomb joined body in which two honeycomb fired bodies were joined with a joining material paste interposed therebetween as illustrated in FIG. 8E, was manufactured.

Next, an aggregated body of honeycomb joined bodies was manufactured by using the same method as in Example 1.

Subsequently, under the same conditions as in Example 1, the aggregated body of the honeycomb joined bodies was heated to dry and solidify the adhesive paste as well as the joining material paste, and thereafter was degreased (700° C., 40 minutes) to manufacture a honeycomb block including an aggregated body of honeycomb joined bodies, which was provided with an adhesive layer with a thickness of 1.0 mm and a joining material layer with a thickness of 3.0 mm, and has a rectangular pillar shape.

Thereafter, a periphery of the honeycomb block including an aggregated body of honeycomb joined bodies was cut into a round pillar shape as with Example 1. Then, as with Example 1, a coat layer was formed on a peripheral face of the honeycomb block, whose periphery is cut into a round pillar shape and which includes an aggregated body of honeycomb joined bodies, and thereby, a honeycomb structure including an aggregated body of honeycomb joined bodies was manufactured.

Then, the honeycomb structure including an aggregated body of honeycomb joined bodies was bisected by cutting a portion located at 1.0 mm from the end faces (boundary face between the joining material layer and the honeycomb fired body) of the joining material layer and the honeycomb fired body in the honeycomb structure including an aggregated body of honeycomb joined bodies using an outer diameter diamond grinder having a thickness of 5.0 mm.

By the procedure described above, two honeycomb structures having a round pillar shape of 143.8 mm in diameter and 101.6 mm in length were manufactured.

In Example 3, the number of honeycomb structures, which can be manufactured per unit time, tends to be more than that in a conventional method for manufacturing a honeycomb structure, and characteristics (pressure loss and capture efficiency) of the manufactured honeycomb structure are almost at the same level as those of the honeycomb structure manufactured by the conventional method for manufacturing a honeycomb structure.

Fourth Embodiment

Hereinafter, a fourth embodiment, which is an embodiment of a method for manufacturing a honeycomb structure of the present invention, will be described.

The method for manufacturing a honeycomb structure of the present embodiment is different from that of the first embodiment of the present invention in that a nonflammable cavity-holding member provided with double-faced tapes on both sides thereof is used as a joining material, and in a method for separating.

In the present embodiment, a joining material is manufactured by attaching the double-faced tapes to both sides of the nonflammable cavity-holding member in joining.

Next, an end face of one honeycomb fired body is bonded to one side of the nonflammable cavity-holding member with a double-faced tape. Subsequently, an end face of another honeycomb fired body is bonded to the other side of the nonflammable cavity-holding member with a double-faced tape to manufacture a honeycomb joined body.

As the double-faced tape, the same double-faced tape as that used in the first embodiment of the present invention is used.

As the nonflammable cavity-holding member, for example, a cavity-holding member including fibrous paper or the like is used.

Here, the nonflammable cavity-holding member used herein refers to a cavity-holding member not burnt out or carbonized at from about 100° C. to about 200° C.

Further, the thickness of the nonflammable cavity-holding member is desirably from about 1.0 mm to about 5.0 mm.

Next, as with the first embodiment of the present invention, side faces of the plurality of honeycomb joined bodies are bonded to one another with an adhesive paste interposed therebetween to manufacture an aggregated body of the honeycomb joined bodies.

Subsequently, as with the first embodiment of the present invention, the aggregated body of the honeycomb joined bodies is heated at a temperature of from about 100° C. to about 200° C. for from about 15 minutes to about 240 minutes to dry and solidify the adhesive paste to manufacture a honeycomb block including an aggregated body of the honeycomb joined bodies. Here, degreasing may be performed after drying and solidifying the adhesive paste.

By drying and solidifying the adhesive paste, as with the first embodiment of the present invention, an adhesive layer and a coupling portion are formed.

Further, the double-faced tape composing the joining material is burnt out or carbonized by heating at the time of drying and solidifying the adhesive paste.

Therefore, in the honeycomb block including an aggregated body of honeycomb joined bodies, two honeycomb blocks are coupled with each other through a coupling portion as with the first embodiment of the present invention.

Here, since the nonflammable cavity-holding member included in the joining material is not burnt out or carbonized at from about 100° C. to about 200° C., the nonflammable cavity-holding member remains in a space surrounded by end faces of two honeycomb blocks and the coupling portion after drying and solidifying the adhesive paste.

Subsequently, as with the first embodiment of the present invention, periphery cutting and coat layer forming are performed to manufacture a honeycomb structure including an aggregated body of honeycomb joined bodies.

Thereafter, as with the third embodiment of the present invention, separating, in which the honeycomb structure including an aggregated body of honeycomb joined bodies is cut with a diamond cutter or the like and separated into two honeycomb structures, is performed.

By the procedure described above, two honeycomb structures are manufactured.

In the present embodiment, the effects (1), (4) and (5) described in the first embodiment of the present invention can be exerted, and the following effect can be exerted.

(9) In the method for manufacturing a honeycomb structure of the present embodiment, a nonflammable cavity-holding member provided with double-faced tapes on both sides thereof is used as a joining material.

When the joining material includes the nonflammable cavity-holding member, it becomes easy to join the honeycomb fired bodies to each other in parallel.

Hereinafter, an example which discloses the fourth embodiment of the present invention more specifically will be shown, and the present invention is not limited to this example.

EXAMPLE 4

First, in the same manner as in Example 3, a honeycomb fired body made of a silicon carbide sintered body was manufactured. The honeycomb fired body had a porosity of 45%, an average pore diameter of 15 μm, a size of 34.3 mm×34.3 mm×102.6 mm, the number of cells (cell density) of 46.5 pcs/cm$^2$ (300 pcs/inch$^2$) and the thickness of a cell wall of 0.25 mm (10 mil).

Here, in consideration of a portion to be cut in separating, the honeycomb fired body, whose length is larger by 1.0 mm than that of a honeycomb structure to be manufactured, was manufactured.

Next, a nonflammable cavity-holding member was manufactured by the following method.

Glass fibers as a main component, wood pulp, feldspar, and aluminum hydroxide were put in water, and mixed to prepare slurry. Then a sheet forming process and dehydration were carried out on the slurry mixture to manufacture a sheet.

Further, the obtained sheet was dried to be made into a sheet having a thickness of 2.7 mm.

Subsequently, a punching process using a die was performed to manufacture a nonflammable cavity-holding member in a size of 35 mm in height×35 mm in width×2.7 mm in thickness.

Then, a joining material (thickness: 3.0 mm) was manufactured by attaching double-faced tapes (acrylic foam bonding tape, adhesive: acrylic, base: acrylic foam, thickness: 0.15 mm) to both sides of a nonflammable cavity-holding member (thickness: 2.7 mm).

Subsequently, as with Example 1, an end face of one honeycomb fired body manufactured was bonded to one side of the nonflammable cavity-holding member with the double-faced tape. Next, an end face of another honeycomb fired body was bonded to the other side of the nonflammable cavity-holding member with the double-faced tape.

By the above method, a honeycomb joined body in which two honeycomb fired bodies were joined with a joining material including a double-faced tape and a nonflammable cavity-holding member interposed therebetween was manufactured.

Next, an aggregated body of honeycomb joined bodies was manufactured by using the same method as in Example 1.

Subsequently, under the same conditions as in Example 1, the aggregated body of the honeycomb joined bodies was heated to dry and solidify the adhesive paste, and thereafter was degreased (700° C., 40 minutes) to burn out or carbonize the double-faced tape included in the joining material. Thereby, a honeycomb block including an aggregated body of honeycomb joined bodies, which was provided with an adhesive layer and a coupling portion, each having a thickness of 1.0 mm, and has a rectangular pillar shape, was manufactured.

In the manufactured honeycomb block including an aggregated body of honeycomb joined bodies, two honeycomb blocks were coupled with each other through a coupling portion. Further, the nonflammable cavity-holding member included in the joining material remained in a space surrounded by end faces of two honeycomb blocks and the coupling portion without being burnt out or carbonized after drying and solidifying the adhesive paste.

Subsequently, a periphery of the honeycomb block including an aggregated body of honeycomb joined bodies was cut into a round pillar shape as with Example 1. Then, as with Example 1, a coat layer was formed on a peripheral face of the honeycomb block, whose periphery is cut into a round pillar shape and which includes an aggregated body of honeycomb joined bodies, and thereby, a honeycomb structure including an aggregated body of honeycomb joined bodies was manufactured.

Thereafter, the honeycomb structure including an aggregated body of honeycomb joined bodies was bisected by cutting a portion located at 1.0 mm from the end faces (boundary face between the joining material layer and the honeycomb fired body) of the joining material and the honeycomb fired body in the honeycomb structure including an aggregated body of honeycomb joined bodies using an outer diameter diamond grinder having a thickness of 5.0 mm.

By the procedure described above, two honeycomb structures having a round pillar shape of 143.8 mm in diameter and 101.6 mm in length were manufactured.

In Example 4, the number of honeycomb structures, which can be manufactured per unit time, tends to be more than that in a conventional method for manufacturing a honeycomb structure, and characteristics (pressure loss and capture efficiency) of the manufactured honeycomb structure are almost at the same level as those of the honeycomb structure manufactured by the conventional method for manufacturing a honeycomb structure.

Other Embodiments

The length of the honeycomb structure manufactured in the method for manufacturing a honeycomb structure according to the embodiment of the present invention is not particularly limited, and the length is desirably about 203.2 mm or less. As seen from the above, the method for manufacturing a honeycomb structure according to the embodiment of the present invention is suitable for the case where a honeycomb structure having a short longitudinal length is manufactured.

In the method for manufacturing a honeycomb structure according to the embodiment of the present invention, the thickness of the joining material is desirably from about 1.0 mm to about 5.0 mm.

In the method for manufacturing a honeycomb structure shown in the first embodiment of the present invention to the fourth embodiment of the present invention, the honeycomb joined body is manufactured by joining end faces of two honeycomb fired bodies to each other, and the number of honeycomb fired bodies joined is not particularly limited.

The shorter the length of the honeycomb structure to be manufactured is, the more honeycomb fired bodies are more likely to be joined.

Moreover, the larger the number of honeycomb fired bodies joined is, the larger the number of aggregated bodies of honeycomb fired bodies, which can be manufactured in one bonding, is more likely to be. Therefore, the number of honeycomb structures, which can be manufactured per unit time, is more likely to be increased more.

In the method for manufacturing a honeycomb structure shown in the first embodiment of the present invention to the fourth embodiment of the present invention, after reaching the stage of manufacturing honeycomb joined bodies by the respective methods and manufacturing a honeycomb structure including an aggregated body of honeycomb joined bodies, the honeycomb structure including an aggregated body of honeycomb joined bodies is separated into honeycomb structures by separating. However, in the method for manufacturing a honeycomb structure according to the embodiment of the present invention, separating may be performed at any time after manufacturing a honeycomb block including an aggregated body of honeycomb joined bodies using honeycomb joined bodies. Hereinafter, another embodiment of separating of the honeycomb block including an aggregated body of honeycomb joined bodies will be described.

Figure 12A:
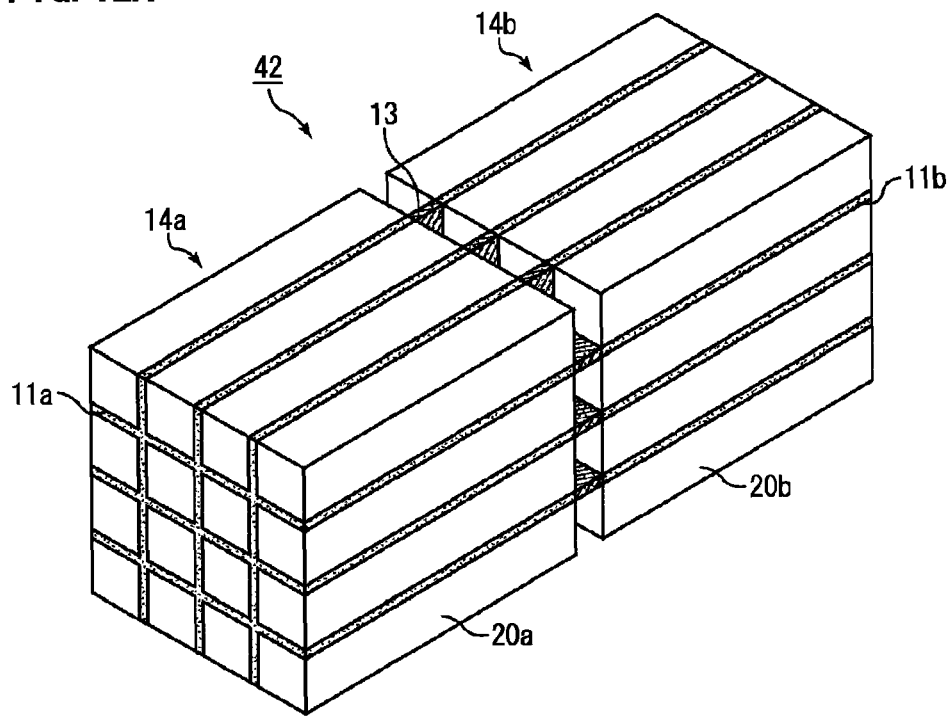
FIG. 12A and FIG. 12B are perspective views schematically showing another example of separating in the embodiment of the present invention.
Figure 12B:
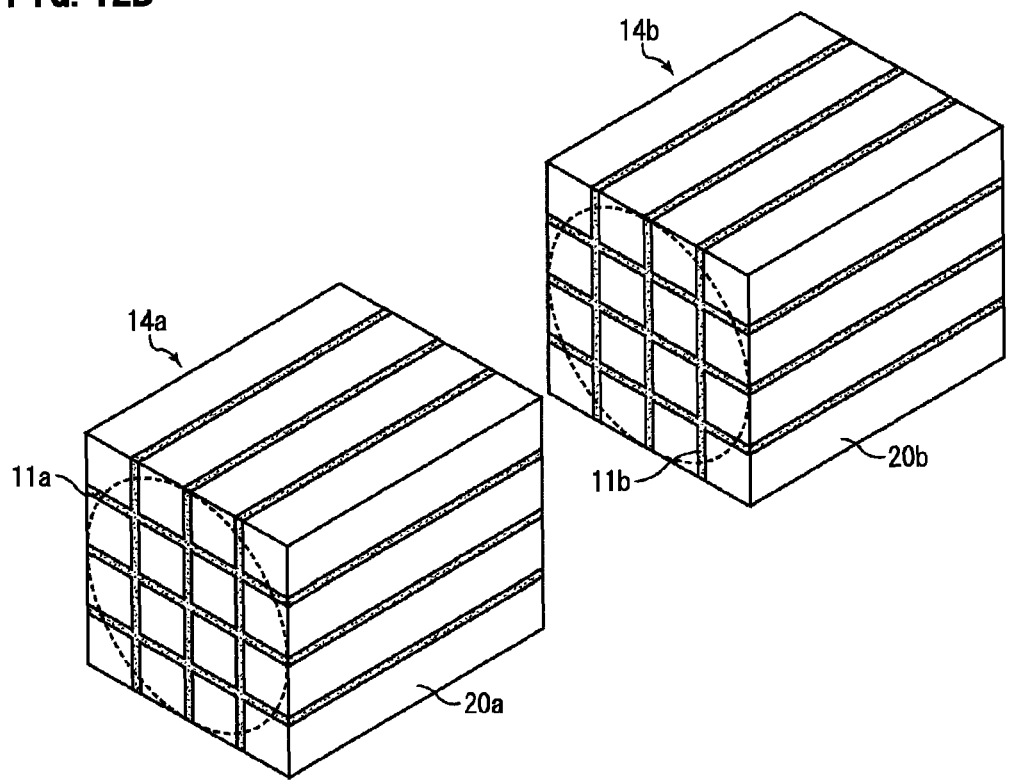

FIG. 12A and FIG. 12B are perspective views schematically showing another example of separating in the embodiment of the present invention.

In FIG. 12A and FIG. 12B, after manufacturing the honeycomb block 42 including an aggregated body of honeycomb joined bodies, the honeycomb block 42 including an aggregated body of honeycomb joined bodies is separated into two honeycomb blocks 14a and 14b.

Figure 13A:
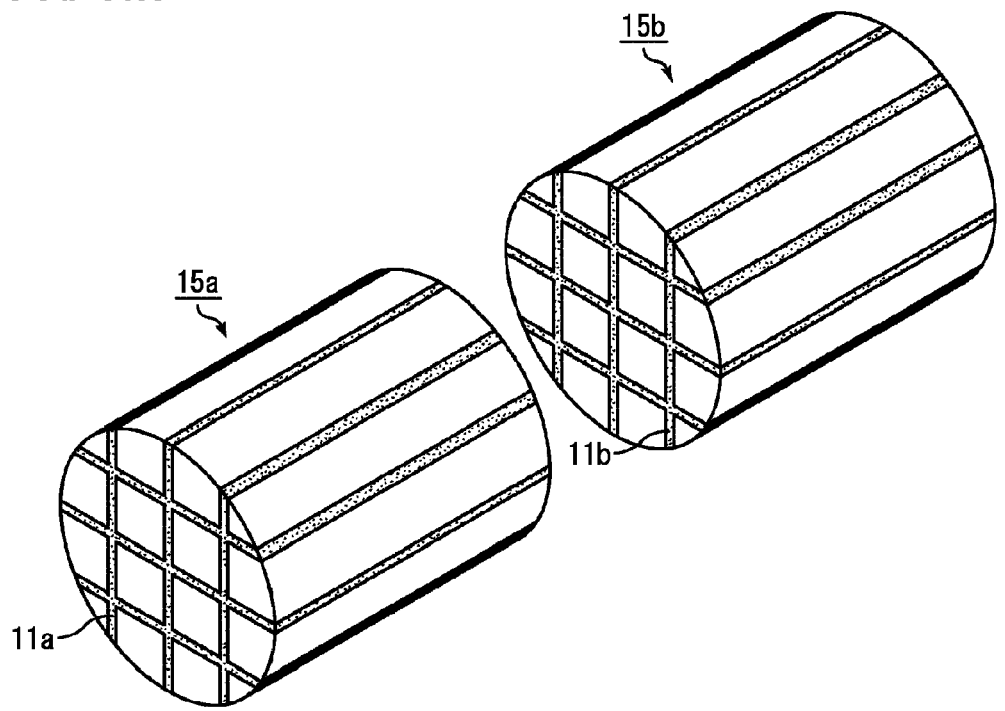
FIG. 13A is a perspective view schematically showing another example of periphery cutting in the embodiment of the present invention.
Figure 13B:
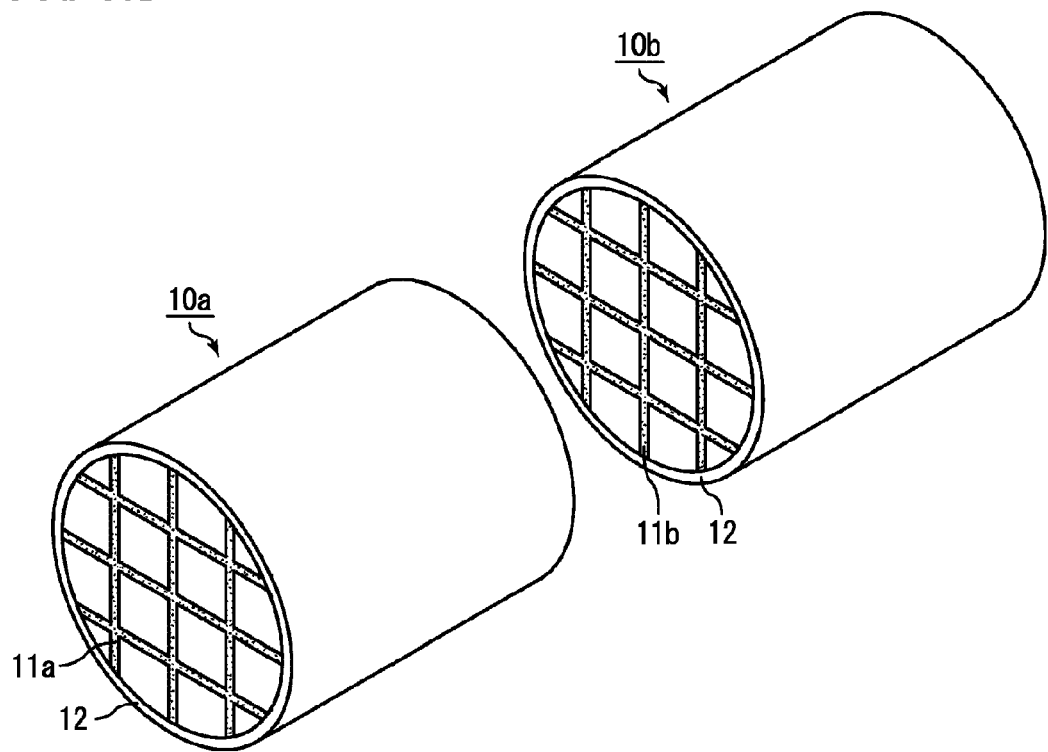
FIG. 13B is a perspective view schematically showing another example of coat layer forming in the embodiment of the present invention.

FIG. 13A is a perspective view schematically showing another example of periphery cutting in the embodiment of the present invention. Further, FIG. 13B is a perspective view schematically showing another example of coat layer forming in the embodiment of the present invention.

After manufacturing two honeycomb blocks 14a and 14b by separating illustrated in FIG. 12A and FIG. 12B, two honeycomb blocks 15a and 15b, whose peripheries are each cut as illustrated in FIG. 13A, are manufactured by cutting the honeycomb blocks 14a and 14b along a broken line in FIG. 12B with a diamond cutter or the like. Thereafter, as with the first embodiment of the present invention, by forming a coat layer on each of peripheral faces of the two honeycomb blocks 15a and 15b whose peripheries are each cut, two honeycomb structures 10a and 10b, which are provided with a coat layer 12 on a peripheral face thereof as illustrated in FIG. 13B, are manufactured.

Figure 14A:
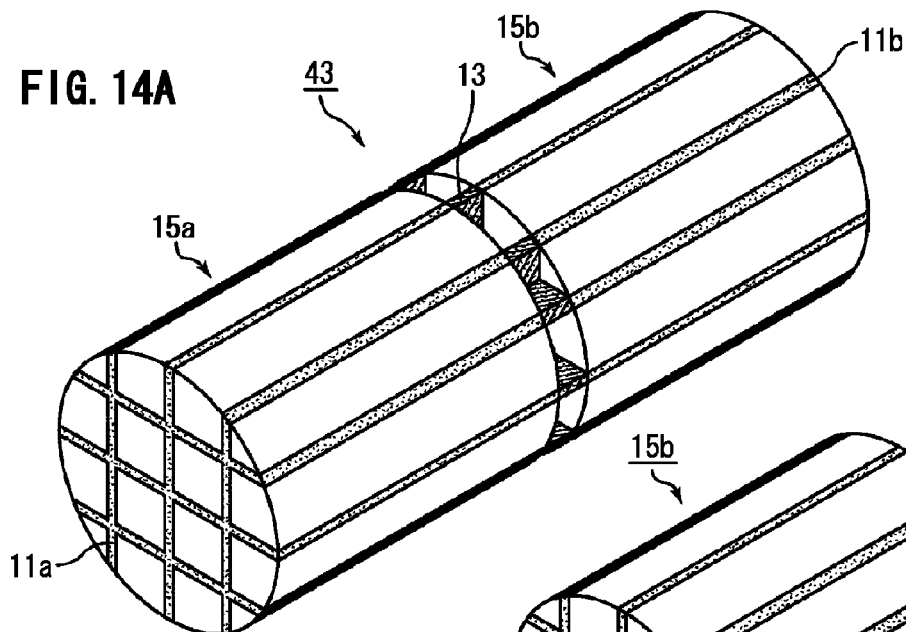
FIG. 14A and FIG. 14B are perspective views schematically showing still another example of separating in the embodiment of the present invention.
Figure 14B:
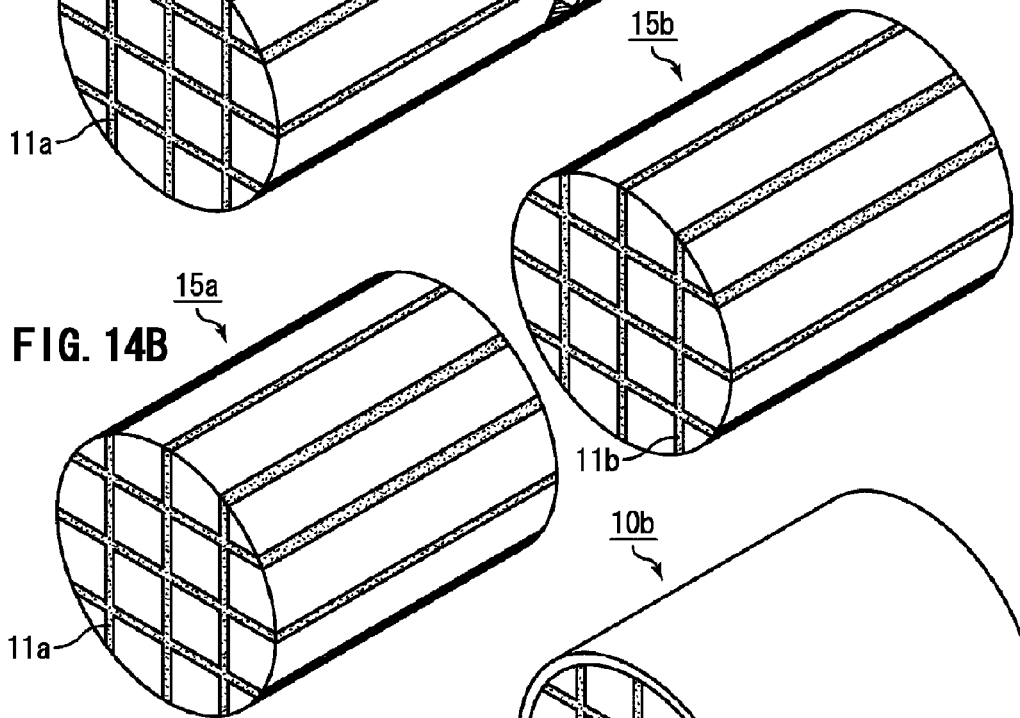
Figure 14C:
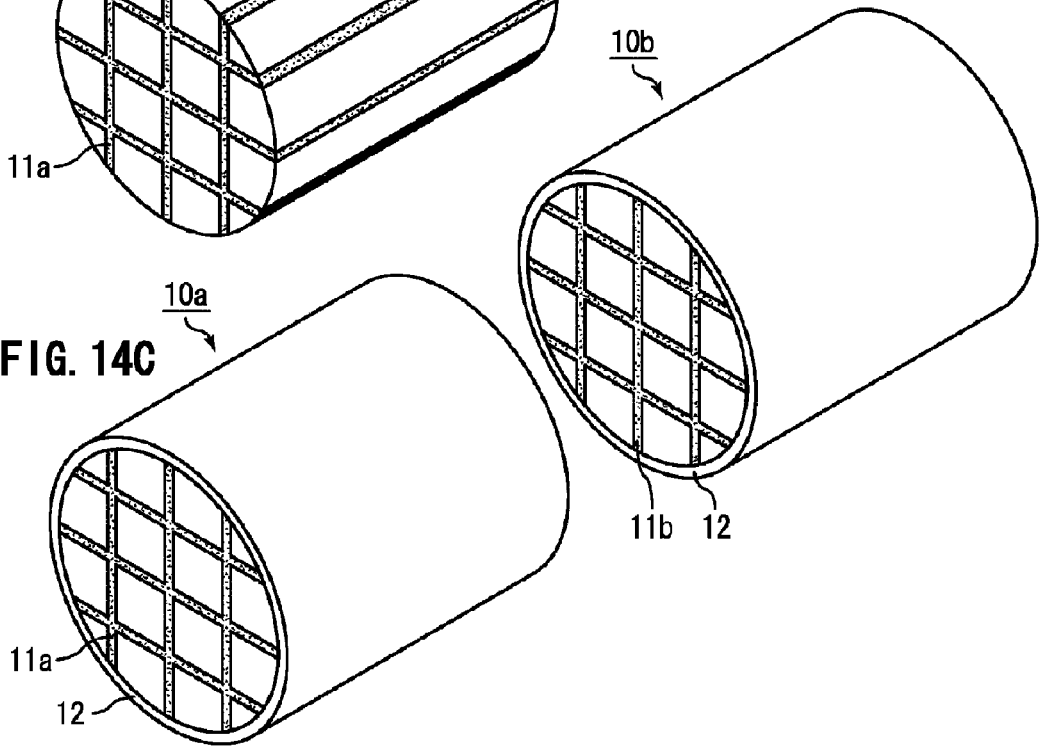
FIG. 14C is a perspective view schematically showing still another example of coat layer forming in the embodiment of the present invention.

FIG. 14A and FIG. 14B are perspective views schematically showing still another example of separating the embodiment of the present invention. Further, FIG. 14C is a perspective view schematically showing still another example of coat layer forming in the embodiment of the present invention.

In FIG. 14A and FIG. 14B, after a honeycomb block 43, whose periphery is cut and which includes an aggregated body of honeycomb joined bodies, is manufactured, the honeycomb block 43, whose periphery is cut and which includes an aggregated body of honeycomb joined bodies, is separated into two honeycomb blocks 15a and 15b whose peripheries are cut. Thereafter, by forming a coat layer on each of peripheral faces of the two honeycomb blocks 15a and 15b whose peripheries are each cut, two honeycomb structures 10a and 10b, which are provided with a coat layer 12 on a peripheral face thereof as illustrated in FIG. 14C, are manufactured.

Among the embodiments of separating, as shown in the first embodiment of the present invention to the fourth embodiment of the present invention, a process, in which after reaching the stage of manufacturing a honeycomb structure including an aggregated body of honeycomb joined bodies, the honeycomb structure including an aggregated body of honeycomb joined bodies is separated into honeycomb structures, is desirable. The reason for this is that number of times of periphery cutting and number of times of coat formation is more likely to be reduced.

In the method for manufacturing a honeycomb structure according to the embodiment of the present invention, a method for separating the honeycomb block including an aggregated body of honeycomb joined bodies into honeycomb blocks is not limited to a method shown in the first embodiment to the fourth embodiment of the present invention.

In the first embodiment of the present invention and the second embodiment of the present invention, the coupling portion is broken off by hand, but the coupling portion may be broken off, for example, by applying an external force to the coupling portion using a machine or a jig, or a portion including the coupling portion may be cut using a diamond cutter.

In the third embodiment of the present invention, a portion including the joining material layer is cut using a diamond cutter, but for example, the joining material layer may be split by applying an external force to the joining material layer using a machine or a jig.

Further, also in the fourth embodiment of the present invention, the honeycomb block including an aggregated body of honeycomb joined bodies is cut with a diamond cutter or the like as with the third embodiment, but the coupling portion may be split, for example, by applying an external force to the coupling portion using a machine or a jig.

Examples of a method for applying an external force include vibration, bending, torsion, tension, loading, and the like.

In the method for manufacturing a honeycomb structure according to the embodiment of the present invention, when the honeycomb block including an aggregated body of honeycomb joined bodies is separated into honeycomb blocks by cutting the honeycomb block including an aggregated body of honeycomb joined bodies, a method for cutting the honeycomb block including an aggregated body of honeycomb joined bodies is not limited to a method illustrated in FIG. 11. Hereinafter, another embodiment of the present invention of the method for cutting the honeycomb block including an aggregated body of honeycomb joined bodies will be described.

Figure 15:
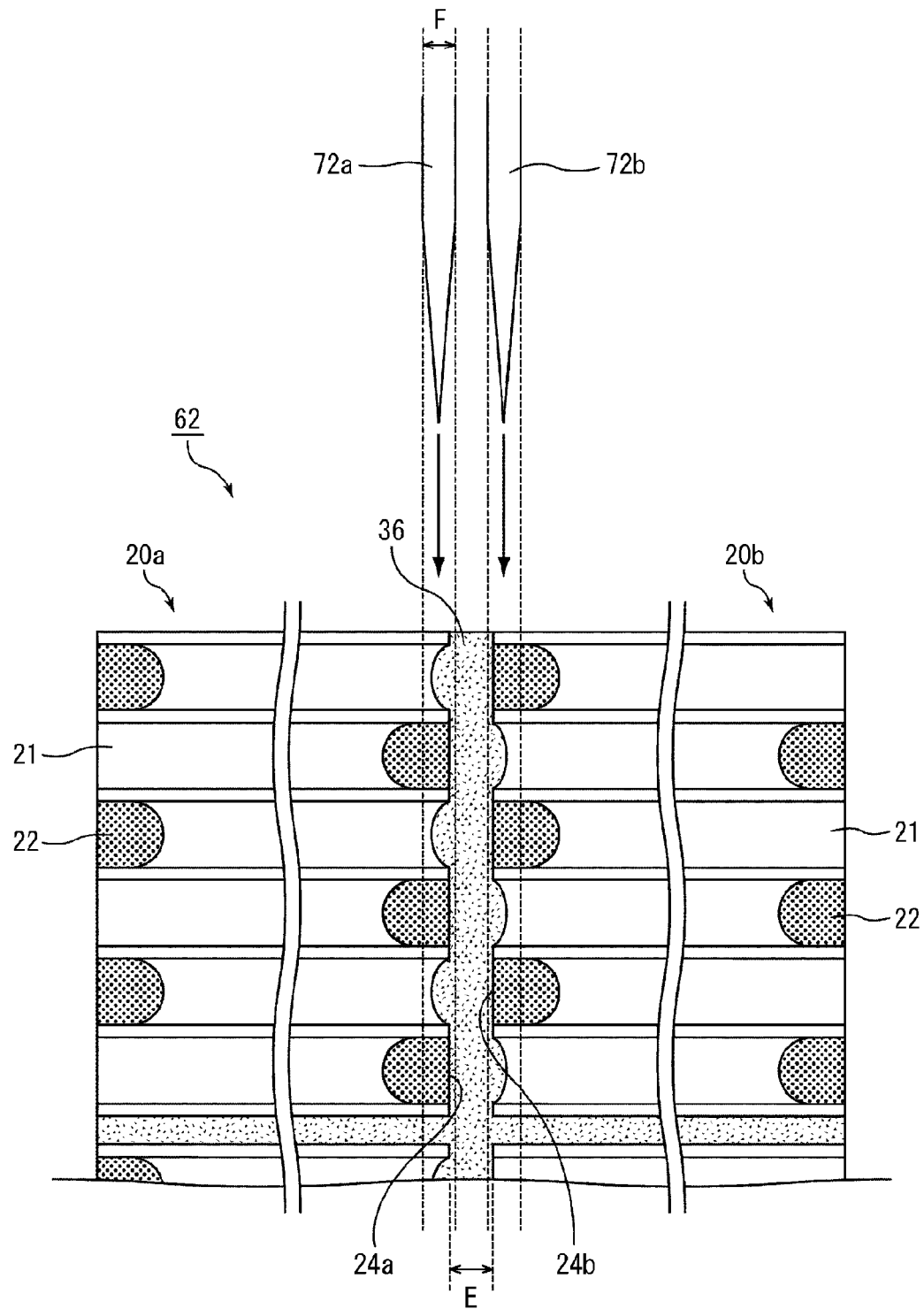
FIG. 15 is an enlarged partial cross-sectional view schematically showing another example of a method for cutting a honeycomb block including an aggregated body of honeycomb joined bodies according to the embodiment of the present invention.
Figure 16:
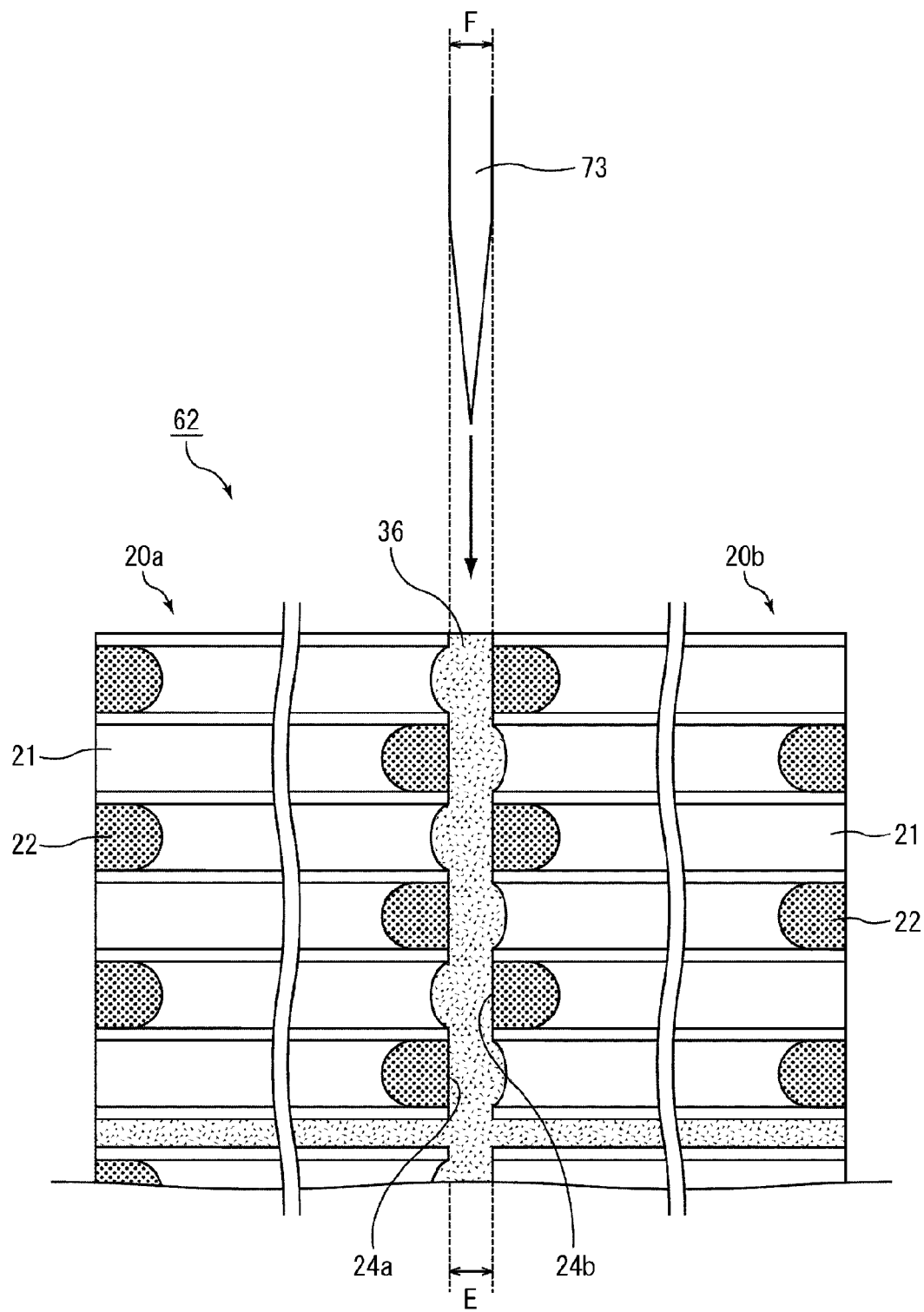
FIG. 16 is an enlarged partial cross-sectional view schematically showing still another example of a method for cutting a honeycomb block including an aggregated body of honeycomb joined bodies according to the embodiment of the present invention.

FIG. 15 is an enlarged partial cross-sectional view schematically showing another example of a method for cutting a honeycomb block including an aggregated body of honeycomb joined bodies according to the embodiment of the present invention. FIG. 16 is an enlarged partial cross-sectional view schematically showing still another example of a method for cutting a honeycomb block including an aggregated body of honeycomb joined bodies according to the embodiment of the present invention.

FIG. 15 shows a method for cutting using a blade having a thickness, which is smaller than the thickness of the blade used in the method illustrated in FIG. 11 and the distance between the end faces of each of the honeycomb fired bodies.

First, a blade 72a is used at a predetermined distance from an end face 24a (boundary face between the joining material layer 36 and one honeycomb fired body 20a) of one honeycomb fired body 20a. Subsequently, a blade 72b is used at a predetermined distance from an end face 24b (boundary face between the joining material layer 36 and the other honeycomb fired body 20b) of the other honeycomb fired body 20b. Thereby, the honeycomb block 62 including an aggregated body of honeycomb joined bodies is more likely to be separated into two honeycomb blocks. Further, the joining material layer 36 penetrated into the cell 21 is also more likely to be removed.

Specifically, when a distance "E" between the end face 24a of the honeycomb fired body 20a and the end face 24b of the honeycomb fired body 20b is about 3.0 mm, the honeycomb block is cut at a location about 1.0 mm from an end face 24a of one honeycomb fired body 20a and at a location about 1.0 mm from an end face 24b of the other honeycomb fired body 20b using an outer diameter diamond grinder having a thickness "F" of from about 2.0 mm to about 3.0 mm.

FIG. 16 shows a method for cutting using a blade having substantially the same thickness as a distance between the end faces of honeycomb fired bodies.

The honeycomb block is cut so as to remove the joining material layer 36 using a blade 73 having substantially the same thickness "F" as a distance "E" between the end face 24a of the honeycomb fired body 20a and the end face 24b of the honeycomb fired body 20b. Thereby, the honeycomb block 62 including an aggregated body of honeycomb joined bodies is more likely to be separated into two honeycomb blocks. Here, in this case, the joining material layer 36 penetrated into the cell 21 may be removed separately after cutting.

Specifically, when a distance "E" between the end face 24a of the honeycomb fired body 20a and the end face 24b of the honeycomb fired body 20b is about 3.0 mm, the honeycomb block is cut using an outer diameter diamond grinder having a thickness "F" of about 3.0 mm.

In the method for manufacturing a honeycomb structure according to the embodiment of the present invention, a method for joining end faces of the honeycomb fired bodies to each other is not limited to a method shown in the first embodiment of the present invention to the fourth embodiment of the present invention, and end faces of the honeycomb fired bodies may be joined to each other as follows, using, for example, a joining material paste and a cavity-holding member as a joining material.

First, a joining material paste is applied to an end face of one honeycomb fired body, and one side of the cavity-holding member is bonded to the joining material paste. Next, a joining material paste is applied to an end face of another honeycomb fired body. Thereafter, the other side of the cavity-holding member is bonded to the joining material paste applied to the end face of another honeycomb fired body. By even such a method, end faces of two honeycomb fired bodies are more likely to be joined to each other.

In the method for manufacturing a honeycomb structure according to the embodiment of the present invention, when the joining material includes a double-faced tape, examples of an adhesive of the double-faced tape include an acrylic adhesive, a rubber adhesive, a silicone adhesive and the like. Among these, the acrylic adhesive is desirable.

Examples of a base (a cavity-holding member) of the double-faced tape include foam, plastic films, nonwoven fabrics, paper and the like. Among the base of the double-faced tape, foam is desirable, and acrylic foam is more desirable. Further, the double-faced tape may have an adhesive and may not have a base.

In the method for manufacturing a honeycomb structure according to the embodiment of the present invention, when the joining material includes a flammable cavity-holding member, examples of the flammable cavity-holding member include cardboard, cloth, plastic, wood and the like. Among the cavity-holding members, cardboard is desirable because it is readily available and is easily burnt out or carbonized by heating.

Further, in the method for manufacturing a honeycomb structure according to the embodiment of the present invention, when the joining material includes a nonflammable cavity-holding member, examples of the nonflammable cavity-holding member include a fibrous paper, an inorganic material sheet, ceramic, glass, metal and the like. Among the nonflammable cavity-holding members, a fibrous paper or an inorganic material sheet is desirable.

The fibrous paper or the inorganic material sheet desirably includes fibers and inorganic particles. The fibrous paper contains inorganic fibers as main components and is a material cut into a so-called sheet shape, such as a paper shape, a mat shape and a felt shape. The inorganic material sheet contains at least one of inorganic particles and fine fibers as a main component and is a material cut into a sheet shape.

The fibers are desirably at least one species selected from the group consisting of alumina fibers, zirconia fibers, alumina-silica fibers, silica fibers, glass fibers, calcium silicate fibers, magnesium silicate fibers, rock wool, glass wool, mineral fibers and synthetic fibers.

The inorganic particles are desirably at least one species selected from the group consisting of silica, titania, alumina, zirconia, spinel, magnesia, aluminum hydroxide, calcium carbonate, talc, calcium silicate, magnesium silicate, perlite, vermiculite and diatomite.

Further, inorganic particles such as MgO, CaO, and feldspar, organic substances such as wood pulp and organic binder, and inorganic fillers other than the inorganic particles may be added to the above fiber, the inorganic particles, or the fiber and the inorganic particles.

In the method for manufacturing a honeycomb structure according to the embodiment of the present invention, when end faces of honeycomb fired bodies are joined to each other with a joining material paste interposed therebetween, a method for drying and solidifying the joining material paste is not particularly limited. In the third embodiment of the present invention, the adhesive paste as well as the joining material paste is simultaneously dried and solidified, but drying and solidifying the joining material paste may be performed separately.

For example, when drying and solidifying of the joining material paste is performed prior to bonding, a honeycomb joined body having end faces more firmly joined to each other is more likely to be manufactured. Therefore, when bonding is carried out using such a honeycomb joined body, there hardly arises the problem that the honeycomb joined body is separated during bonding and a position gap in the honeycomb fired bodies is generated.

Further, in the method for manufacturing a honeycomb structure according to the embodiment of the present invention, when the joining material paste is used, the joining material paste may include the same material as that of the adhesive paste, or may include a material different from that of the adhesive paste. When a coating material paste is used, the coating material paste may include the same material as that of the adhesive paste, or may include a material different from that of the adhesive paste. Further, the joining material paste may include the same material as that of the coating material paste.

Among these cases, the case where the adhesive paste, the joining material paste and the coating material paste are made of the same material is desirable. The reason for this is that when the pastes whose materials are the same are used, it is less necessary to prepare each paste.

The joining material paste desirably has high viscosity and low fluidity for preventing its penetration into a cell.

In the method for manufacturing a honeycomb structure according to the embodiment of the present invention, bonding, in which side faces of a plurality of honeycomb joined bodies are bonded to one another with the adhesive paste interposed therebetween to manufacture an aggregated body of honeycomb joined bodies, is not limited to the method illustrated in FIG. 2.

A plurality of honeycomb joined bodies are placed in parallel with one another in a vertical direction and a lateral direction with a spacer, which is designed to have substantially the same thickness as that of the adhesive layer to be formed between the honeycomb joined bodies, interposed therebetween. Therefore, a cavity corresponding to the thickness of the spacer is formed between the honeycomb joined bodies.

For example, 16 honeycomb joined bodies (vertically 4 bodies and laterally 4 bodies) are placed in parallel with one another to make a parallel-arranged body of the honeycomb joined bodies, and an adhesive paste is injected in the cavity of the parallel-arranged honeycomb joined body using a filling apparatus.

By doing in this manner, it is also possible to manufacture an aggregated body of honeycomb joined bodies, formed by filling the adhesive paste between 16 honeycomb joined bodies.

In the honeycomb structure manufactured by the method for manufacturing a honeycomb structure according to the embodiment of the present invention, a shape of a cross section perpendicular to a longitudinal direction of a honeycomb fired body of each cell is not particularly limited. In the honeycomb structures manufactured by the methods for manufacturing a honeycomb structure of the first embodiment of the present invention to the fourth embodiment of the present invention, shapes of cross sections perpendicular to a longitudinal direction of a honeycomb fired body of cells are totally substantially the same and a substantially rectangle, but a combination of a substantially octagon and a substantially rectangle may be used.

Figure 17A:
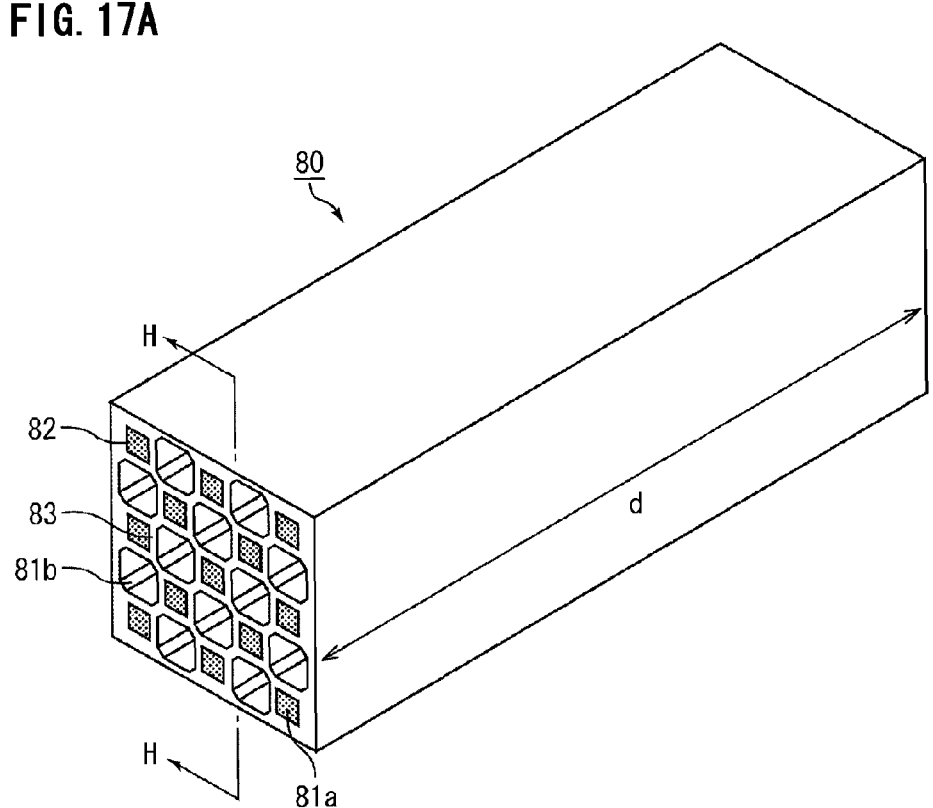
FIG. 17A is a perspective view schematically showing another example of the honeycomb-fired body according to the embodiment of the present invention.
Figure 17B:
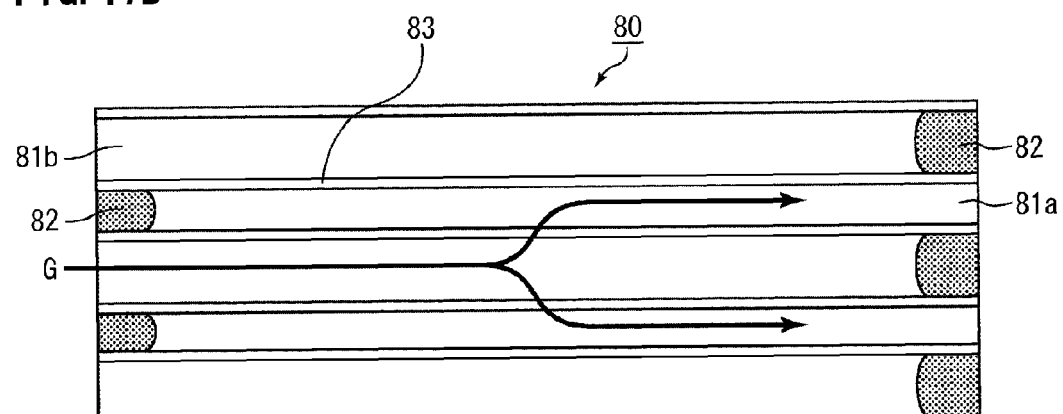
FIG. 17B is a cross-sectional view taken on line H-H of FIG. 17A.

FIG. 17A is a perspective view schematically showing another example of the honeycomb fired body according to the embodiment of the present invention, and FIG. 17B is a cross-sectional view taken on line H-H of FIG. 17A.

In the honeycomb fired body 80 illustrated in FIG. 17A and FIG. 17B, a plurality of cells 81*a*, 81*b* are placed longitudinally (in a direction indicated by an arrow "d" in FIG. 17A) in parallel with one another with a cell wall 83 interposed therebetween, and either one end of each of the cells 81*a*, 81*b* is sealed with a plug 82.

Here, a shape of a cross section perpendicular to the longitudinal direction of the cell 81*a* is a substantially rectangle and a shape of a cross section perpendicular to the longitudinal direction of the cell 81*b* is a substantially octagon.

In the methods for manufacturing a honeycomb structure of the first embodiment of the present invention to the fourth embodiment of the present invention, a plurality of substantially rectangular pillar-shaped honeycomb joined bodies are bound to manufacture an aggregated body of honeycomb joined bodies, and a honeycomb block including an aggregated body of honeycomb joined bodies is manufactured by drying and solidifying the adhesive paste, and then the honeycomb block including an aggregated body of honeycomb joined bodies is cut. However, in the method for manufacturing a honeycomb structure according to the embodiment of the present invention, it is possible that a plurality of honeycomb joined bodies, formed by using a honeycomb fired body manufactured in a predetermined configuration, are bound to manufacture an aggregated body of honeycomb joined bodies, and a honeycomb block including an aggregated body of honeycomb joined bodies is manufactured without periphery cutting by drying and solidifying the adhesive paste.

Figure 18A:
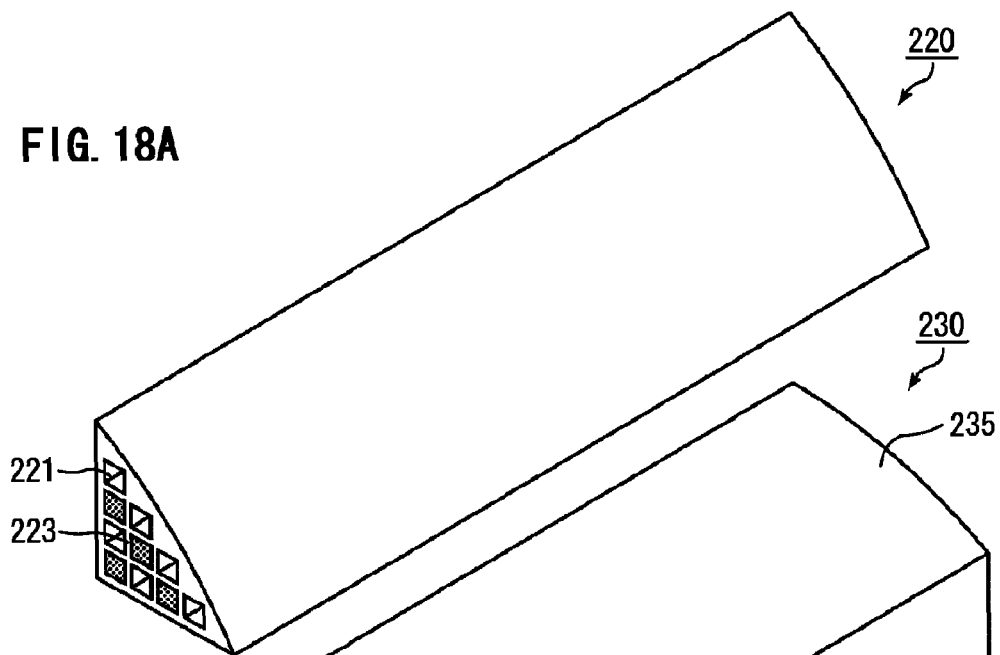
FIG. 18A to FIG. 18C are perspective views schematically showing another example of the honeycomb fired body according to the embodiment of the present invention.
Figure 18B:
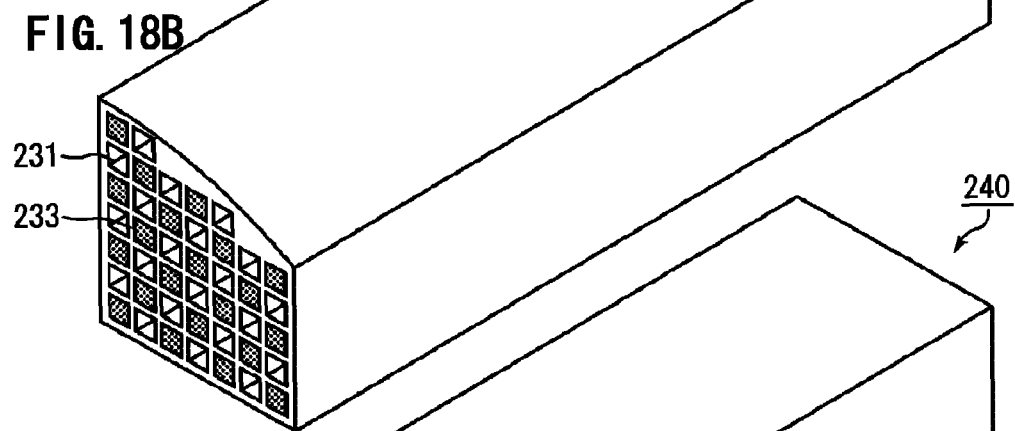
Figure 18C:
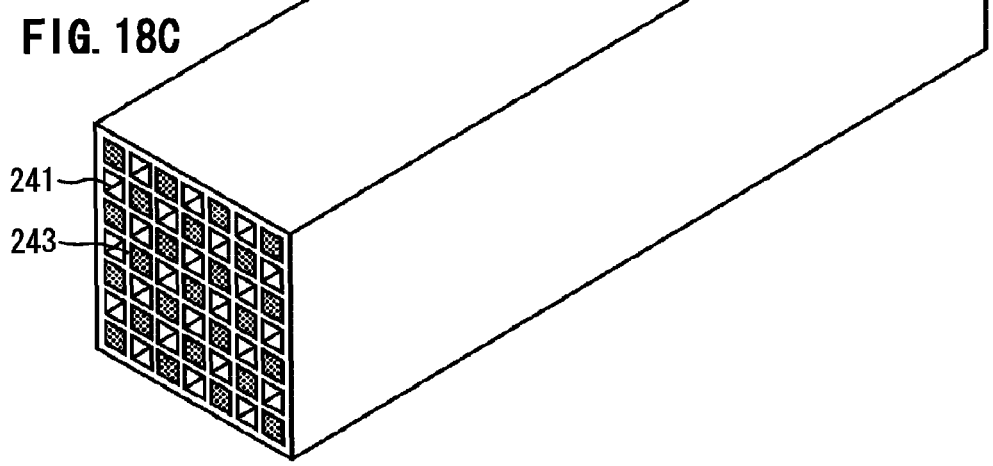

FIG. 18A to FIG. 18C are perspective views schematically showing another example of the honeycomb fired body according to the embodiment of the present invention.

That is, a honeycomb joined body may be manufactured by using a honeycomb fired body 220 (a honeycomb fired body having a cross-sectional shape surrounded by two substantially straight lines and one substantially arcuate curve), a honeycomb fired body 230 (a honeycomb fired body having a cross-sectional shape surrounded by three substantially straight lines and one substantially arcuate curve), a honeycomb fired body 240 (a honeycomb fired body having a cross-sectional shape surrounded by four substantially straight lines), in which a plurality of cells 221, 231, 241 are formed with cell walls 223, 233, 243 interposed therebetween, as illustrated in FIG. 18A to FIG. 18C, and these honeycomb joined bodies may be bound by predetermined numbers to manufacture an aggregated body of honeycomb joined bodies. By drying and solidifying the adhesive paste for the manufactured aggregated body of honeycomb joined bodies, a honeycomb block including an aggregated body of honeycomb joined bodies, which has a substantially round pillar shape, can be manufactured without periphery cutting.

Here, when the honeycomb block 15 illustrated in FIG. 6 is manufactured, 4 honeycomb fired bodies 220, 4 honeycomb fired bodies 240, and 8 honeycomb fired bodies 230 may be used.

In the first embodiment of the present invention to the fourth embodiment of the present invention, there is no description on supporting of a catalyst on the manufactured honeycomb structure, but a catalyst may be supported on the honeycomb structure manufactured by the method for manufacturing a honeycomb structure according to the embodiment of the present invention.

Examples of a method for supporting a catalyst on the honeycomb structure include a method in which an oxide film containing alumina or the like having a large specific surface area is formed on the surface of the honeycomb structure, and a catalyst containing noble metals, alkali metals, alkaline earth metals, oxides, or the like is provided for the surface of the oxide film.

With respect to an adhesive paste used in the embodiments of the present invention, examples of the inorganic particles in the adhesive paste include carbide particles, nitride particles and the like, and more specifically include silicon carbide particles, silicon nitride particles, boron nitride particles, and the like. These inorganic particles may be used alone, or may be used in combination of two or more kinds. Silicon carbide having excellent thermal conductivity is desirably used among these inorganic particles.

Examples of the inorganic binder in the adhesive paste include silica sol, alumina sol and the like. These sol may be used alone, or may be used in combination of two or more kinds. Silica sol is desirably used among the inorganic binders.

Examples of the inorganic fibers in the adhesive paste include fibers of ceramics such as silica-alumina, mullite, alumina and silica, and the like. These inorganic fibers may be used alone, or may be used in combination of two or more kinds. Alumina fiber is desirably used among the inorganic fibers.

The shape of the honeycomb structure manufactured by the method for manufacturing a honeycomb structure according to the embodiment of the present invention is not limited to the substantially round pillar shape illustrated in FIG. 6, and the shape may be any pillar shape such as a substantially cylindroid pillar shape and a substantially polygonal pillar shape.

A porosity of the honeycomb fired body manufactured by the method for manufacturing a honeycomb structure according to the embodiment of the present invention is not particularly limited, and the porosity is desirably from about 35% to about 60%.

An average pore diameter of the honeycomb fired body is desirably from about 5 μm to about 30 μm.

Here, the porosity and the average pore diameter can be measured by the conventionally publicly known methods such as mercury porosimetry, an Archimedes method, and a measuring method using a scanning electron microscope (SEM).

A cell density in a cross section perpendicular to a longitudinal direction of the honeycomb fired body manufactured by the method for manufacturing a honeycomb structure according to the embodiment of the present invention is not particularly limited, and a desired lower limit of the cell density is about 31.0 pcs/cm$^2$ (about 200 pcs/inch$^2$) and a desired upper limit is about 93.0 pcs/cm$^2$ (about 600 pcs/inch$^2$), and a more desired lower limit is about 38.8 pcs/cm$^2$ (about 250 pcs/inch$^2$) and a more desired upper limit is about 77.5 pcs/cm$^2$ (about 500 pcs/inch$^2$).

Further, the thickness of the cell wall of the honeycomb fired body is not particularly limited, and is desirably from about 0.1 mm to about 0.4 mm.

The main component of the constituent materials of the bhoneycomb fired body is not limited to silicon carbide, and other ceramic raw materials may be used as the main component. Examples of other ceramic raw materials include a powder of ceramic, for example, nitride ceramics such as aluminum nitride, silicon nitride, boron nitride, and titanium nitride; carbide ceramics such as zirconium carbide, titanium carbide, tantalum carbide, and tungsten carbide; oxide ceramics such as alumina, zirconia, cordierite, mullite, and aluminum titanate; and the like.

Among these ceramics, non-oxide ceramics are desirable, and silicon carbide is particularly desirable because this is superior in heat resistance, mechanical strength, thermal conductivity and the like. Examples of the constituent materials also include ceramic materials such as silicon-containing ceramics in which metallic silicon is mixed in the above ceramics, and ceramics in which the above ceramics are bound through silicon or silicate compounds. Among these, those ceramics (silicon-containing silicon carbide) in which metallic silicon is mixed in silicon carbide are desirable. Especially, silicon-containing silicon carbide ceramics containing about 60% by weight or more of silicon carbide are desirable.

In the method for manufacturing a honeycomb structure according to the embodiment of the present invention, a material of an organic binder in the wet mixture to be extrusion-molded is not particularly limited, and examples of the material of the organic binder include methyl cellulose, carboxymethyl cellulose, hydroxyethyl cellulose, polyethylene glycol and the like.

A plasticizer in the wet mixture is not particularly limited, and examples of the plasticizer include glycerin, or the like.

A lubricant in the wet mixture is not particularly limited, and examples of the lubricant include polyoxyalkylene compounds such as polyoxyethylene alkyl ether and polyoxypropylene alkyl ether, and the like.

Specific examples of the lubricant include polyoxyethylene monobutyl ether, polyoxypropylene monobutyl ether, and the like.

Here, the wet mixture may not contain the plasticizer or the lubricant.

Further, a dispersion medium may be used in preparing the wet mixture, and examples of the dispersion medium include water, an organic solvent such as benzene, alcohol such as methanol, and the like.

Furthermore, a forming auxiliary may be added to the wet mixture.

The forming auxiliary is not particularly limited, and examples thereof include ethylene glycol, dextrin, fatty acids, fatty acid soap, polyalcohols, and the like.

Furthermore, a pore-forming agent such as balloons which are fine hollow spheres containing oxide ceramics, spherical acrylic particles, graphite, and the like may be added to the wet mixture as required.

The balloons are not particularly limited, and examples thereof include alumina balloons, glass micro balloons, shirasu balloons, fly ash balloons (FA balloons), mullite balloons, and the like. Alumina balloons are desirable among these.

The honeycomb structure in which either one end of each of the cells is sealed is described in the embodiments of the present invention, and the honeycomb structure according to the embodiment of the present invention may be one in which either one end of each of the cells is not sealed.

The same effects of the honeycomb structure in which either one end of each of the cells is sealed can be presumably obtained also in the honeycomb structure in which either one end of each of the cells is not sealed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for manufacturing a honeycomb structure, comprising:
    molding a ceramic raw material to manufacture honeycomb molded bodies each having cell walls extending along a longitudinal direction of each of the honeycomb molded bodies to define cells between the cell walls;
    firing said honeycomb molded bodies to manufacture honeycomb fired bodies;
    joining end faces of at least two of the honeycomb fired bodies interposing a joining material between the end faces to manufacture honeycomb joined bodies each having a length larger than a length of each of the honeycomb fired bodies;
    bonding side faces of the honeycomb joined bodies interposing an adhesive paste between the side faces to manufacture an aggregated body of the honeycomb joined bodies;
    drying and solidifying said adhesive paste to manufacture a honeycomb block comprising the aggregated body of the honeycomb joined bodies; and
    separating said honeycomb block at a position of the joining material into at least two honeycomb blocks in which side faces of the plurality of honeycomb fired bodies are bonded to one another.

2. The method for manufacturing a honeycomb structure according to claim 1,
    wherein
    the joining material comprises a double-faced tape.

3. The method for manufacturing a honeycomb structure according to claim 2,
    wherein
    the joining material further comprises a cavity-holding member provided with the double-faced tape on both faces of the cavity-holding member.

4. The method for manufacturing a honeycomb structure according to claim 3,
    wherein
    the cavity-holding member is flammable.

5. The method for manufacturing a honeycomb structure according to claim 4,
    wherein
    the flammable cavity-holding member comprises a cardboard.

6. The method for manufacturing a honeycomb structure according to claim 3,
    wherein
    the cavity-holding member is nonflammable.

7. The method for manufacturing a honeycomb structure according to claim 6,
    wherein
    the nonflammable cavity-holding member comprises at least one of a fibrous paper, an inorganic material sheet, a ceramic, a glass, and a metal.

8. The method for manufacturing a honeycomb structure according to claim 2,
    wherein
    the drying and solidifying of the adhesive paste comprises burning out or carbonizing the double-faced tape simultaneously with the drying and solidifying of the adhesive paste.

9. The method for manufacturing a honeycomb structure according to claim 3,
    wherein
    the drying and solidifying of the adhesive paste comprises burning out or carbonizing at least one of the double-faced tape and the cavity-holding member simultaneously with the drying and solidifying of the adhesive paste.

10. The method for manufacturing a honeycomb structure according to claim 1,
    wherein
    the joining material comprises a joining material paste containing an inorganic sol.

11. The method for manufacturing a honeycomb structure according to claim 10,
    wherein
    the joining material paste comprises a same material as a material of the adhesive paste.

12. The method for manufacturing a honeycomb structure according to claim 10, further comprising drying and solidifying the joining material paste prior to the bonding of the side faces of the honeycomb joined bodies.

13. The method for manufacturing a honeycomb structure according to claim 10,
    wherein
    the drying and solidifying of the adhesive paste comprises drying and solidifying the joining material paste simultaneously with the drying and solidifying of the adhesive paste.

14. The method for manufacturing a honeycomb structure according to claim 1, further comprising:
    applying a coating material paste to a peripheral face of the honeycomb block; and
    drying and solidifying the coating material paste before the separating and after the drying and solidifying of the adhesive paste.

15. The method for manufacturing a honeycomb structure according to claim 1,
    wherein
    the separating comprises applying an external force to the honeycomb block to separate the honeycomb block at a position of the joining material.

16. The method for manufacturing a honeycomb structure according to claim 1,
    wherein
    the separating comprises cutting a portion including the joining material along a plane in parallel with the end faces of the honeycomb fired bodies.

17. The method for manufacturing a honeycomb structure according to claim 1, further comprising:
    filling a plug material paste in either one end of each of the cells to seal the one end of each of the cells after the manufacturing of the honeycomb molded bodies and before the firing of the honeycomb molded bodies.

18. The method for manufacturing a honeycomb structure according to claim 1, after the drying and solidifying of the adhesive paste and before the separating, further comprising:
    cutting a periphery of the honeycomb block to manufacture a honeycomb block having a cut periphery and comprising the aggregated body of the honeycomb joined bodies;
    applying a coating material paste to a peripheral face of the honeycomb block having the cut periphery;
    drying and solidifying the coating material paste to manufacture a honeycomb structure comprising the aggregated body of the honeycomb joined bodies; and,
    the separating comprises separating the honeycomb structure into at least two honeycomb structures.

19. The method for manufacturing a honeycomb structure according to claim 1, after the separating, further comprising:

cutting peripheries of the at least two honeycomb blocks to manufacture at least two honeycomb blocks having cut peripheries;
applying a coating material paste to a peripheral face of each of the at least two honeycomb blocks having the cut peripheries; and
drying and solidifying the coating material paste.

20. The method for manufacturing a honeycomb structure according to claim 1, further comprising:
cutting a periphery of the honeycomb block after the drying and solidifying of the adhesive paste and before the separating, the separating comprising separating the honeycomb block having a cut periphery into at least two honeycomb blocks having cut peripheries;
applying, after the separating, a coating material paste to a peripheral face of each of the at least two honeycomb blocks having the cut peripheries; and
drying and solidifying the coating material paste.

21. The method for manufacturing a honeycomb structure according to claim 1,
wherein
the drying and solidifying of the adhesive paste comprises
forming adhesive layers between side faces of the honeycomb fired bodies, and
forming coupling portions so that each of the coupling portions is integrated with each of the adhesive layers to couple one adhesive layer to an adjacent adhesive layer among the adhesive layers,
wherein
the separating comprises breaking off the coupling portions by hand or by using a machine.

22. The method for manufacturing a honeycomb structure according to claim 21, further comprising:
after the breaking off of the coupling portions, removing a residue of the coupling portions adhering to end faces of the honeycomb fired bodies by using a brush or a high-pressure water stream.

23. The method for manufacturing a honeycomb structure according to claim 16,
wherein
the portion including the joining material is cut by using a blade having a thickness which is larger than a distance between opposing end faces of the honeycomb fired bodies.

24. The method for manufacturing a honeycomb structure according to claim 16,
wherein
the portion including the joining material is cut by using a blade having a thickness which is smaller than a distance between opposing end faces of the honeycomb fired bodies, and
wherein
the blade is used at a predetermined distance from an end face of one of opposing honeycomb fired bodies among the honeycomb fired bodies, and the blade is used at a predetermined distance from an end face of another one of the opposing honeycomb fired bodies.

25. The method for manufacturing a honeycomb structure according to claim 16,
wherein
the portion including the joining material is cut by using blades each having a thickness which is smaller than a distance between opposing end faces of the honeycomb fired bodies, and
wherein
one of the blades is used at a predetermined distance from an end face of one opposing honeycomb fired bodies among the honeycomb fired bodies, and another of the blades is used at a predetermined distance from an end face of another one of the opposing honeycomb fired bodies.

26. The method for manufacturing a honeycomb structure according to claim 16,
wherein
the portion including the joining material is cut by using a blade having substantially a same thickness as a distance between opposing end faces of the honeycomb fired bodies.

27. The method for manufacturing a honeycomb structure according to claim 16,
wherein
the portion including the joining material is cut with at least one of a diamond cutter, an outer diameter diamond grinder, an inner diameter diamond grinder, a multi-wire, a multi-blade, a water jet, and a high-pressure washing machine.

28. The method for manufacturing a honeycomb structure according to claim 1,
wherein
a thickness of the joining material is from about 1.0 mm to about 5.0 mm.

29. The method for manufacturing a honeycomb structure according to claim 1,
wherein
a length of the manufactured honeycomb structure is about 203.2 mm or less.

30. The method for manufacturing a honeycomb structure according to claim 2,
wherein
the double-faced tape comprises an acrylic foam bonding tape in which a base including an acrylic foam comprises an acrylic adhesive.

31. The method for manufacturing a honeycomb structure according to claim 3,
wherein
the double-faced tape comprises an adhesive comprising at least one of an acrylic adhesive, a rubber adhesive, and a silicone adhesive, and
wherein
the cavity-holding member comprises at least one of foam, plastic films, nonwoven fabrics, and paper.

32. The method for manufacturing a honeycomb structure according to claim 4,
wherein
the flammable cavity-holding member is burnt out or carbonized at from about 100° C. to about 200° C.

33. The method for manufacturing a honeycomb structure according to claim 4,
wherein
the flammable cavity-holding member comprises at least one of cardboard, cloth, plastic, and wood.

34. The method for manufacturing a honeycomb structure according to claim 10, further comprising:
applying a coating material paste to a peripheral face of the honeycomb block; and
drying and solidifying the coating material paste before the separating and after the drying and solidifying of the adhesive paste,
wherein
the joining material paste and the coating material paste comprise a same material as a material of the adhesive paste.

35. The method for manufacturing a honeycomb structure according to claim 1, wherein the bonding of the side faces of the honeycomb joined bodies comprises placing a plurality of honeycomb joined bodies among the honeycomb joined bodies in parallel with one another in columns and rows with a spacer interposed between the plurality of honeycomb joined bodies so as to form a parallel-arranged body of honeycomb joined bodies having a gap between the honeycomb joined bodies, and filling the gap with the adhesive paste by using a filling apparatus.

36. The method for manufacturing a honeycomb structure according to claim 1, wherein the bonding of the side faces of the honeycomb joined bodies comprises applying the adhesive paste on a predetermined side surface of each of the honeycomb joined bodies, and placing the honeycomb joined bodies on the adhesive paste.

37. The method for manufacturing a honeycomb structure according to claim 1, wherein the molding of the ceramic raw material and the firing of the honeycomb molded bodies comprise manufacturing multiple kinds of honeycomb fired bodies having mutually different cross-sectional shapes.

38. The method for manufacturing a honeycomb structure according to claim 37, wherein the honeycomb fired bodies having mutually different cross-sectional shapes comprise a honeycomb fired body having a cross-sectional shape surrounded by two substantially straight lines and one substantially arcuate curve, a honeycomb fired body having a cross-sectional shape surrounded by three substantially straight lines and one substantially arcuate curve, and a honeycomb fired body having a cross-sectional shape surrounded by four substantially straight lines.

\* \* \* \* \*